US012579779B2

(12) United States Patent
Lee et al.

(10) Patent No.: US 12,579,779 B2
(45) Date of Patent: Mar. 17, 2026

(54) INFORMATION ACQUISITION METHOD BASED ON ALWAYS-ON CAMERA

(71) Applicant: SAMSUNG ELECTRONICS CO., LTD., Suwon-si (KR)

(72) Inventors: Sanghun Lee, Suwon-si (KR); Sungoh Kim, Suwon-si (KR); Kyoungkeun Park, Suwon-si (KR); Dasom Lee, Suwon-si (KR); Daiwoong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 18/341,245

(22) Filed: Jun. 26, 2023

(65) Prior Publication Data

US 2023/0334823 A1 Oct. 19, 2023

Related U.S. Application Data

(63) Continuation of application No. PCT/KR2021/001381, filed on Feb. 2, 2021.

(30) Foreign Application Priority Data

Jan. 12, 2021 (KR) ........................ 10-2021-0004243

(51) Int. Cl.
*G06V 10/762* (2022.01)
*G06V 10/44* (2022.01)
(Continued)

(52) U.S. Cl.
CPC ............ *G06V 10/762* (2022.01); *G06V 10/44* (2022.01); *G06V 10/803* (2022.01); *G06V 40/171* (2022.01); *G06V 40/50* (2022.01)

(58) Field of Classification Search
CPC .. G06V 10/762; G06V 40/171; G06V 10/803; G06V 10/44; G06V 40/50
See application file for complete search history.

(56) References Cited

U.S. PATENT DOCUMENTS 7,756,334 B2 7/2010 Kim et al.
7,831,599 B2 11/2010 Das et al.
(Continued)

FOREIGN PATENT DOCUMENTS

CN 105357401 2/2016
JP 2009199322 A 9/2009
(Continued)

OTHER PUBLICATIONS

International Search Report and Written Opinion of the ISA for PCT/KR2021/001381 mailed Oct. 6, 2021, 9 pages.
(Continued)

*Primary Examiner* — David Perlman
(74) *Attorney, Agent, or Firm* — Nixon & Vanderhye P.C.

(57) ABSTRACT

According to the present disclosure, a method performed by an electronic device may include: obtaining image data using an always-on camera, obtaining sensor data, obtaining combined data from the image data and the sensor data based on an obtained time of the image data and an obtained time of the sensor data, extracting at least one feature based on the combined data, generating and storing at least one feature set based on the at least one feature, performing clustering on the at least one feature set, and storing a result of performing the clustering.

20 Claims, 13 Drawing Sheets

(51) Int. Cl.

| | | |
|---|---|---|
| *G06V 10/80* | (2022.01) | |
| *G06V 40/16* | (2022.01) | |
| *G06V 40/50* | (2022.01) | |

(56) References Cited

U.S. PATENT DOCUMENTS

| | | | |
|---|---|---|---|
| 8,036,432 | B2 | 10/2011 | Kim et al. |
| 9,141,872 | B2 | 9/2015 | Marchisio et al. |
| 9,536,167 | B2 | 1/2017 | Schwartz |
| 9,661,221 | B2 | 5/2017 | Sadasivam et al. |
| 10,127,439 | B2 | 11/2018 | Wang et al. |
| 10,198,625 | B1 | 2/2019 | Shin et al. |
| 11,080,316 | B1 * | 8/2021 | Das ....................... G06F 16/434 |
| 11,449,544 | B2 | 9/2022 | Choi et al. |
| 2007/0206834 | A1 | 9/2007 | Shinkai et al. |
| 2008/0320039 | A1 * | 12/2008 | Ohwa ..................... G06T 11/60 |
| | | | 707/E17.046 |
| 2011/0099199 | A1 | 4/2011 | Stalenhoef et al. |
| 2012/0117474 | A1 * | 5/2012 | Miki ....................... G06F 16/51 |
| | | | 715/732 |
| 2014/0016831 | A1 | 1/2014 | Yokoi et al. |
| 2014/0229835 | A1 * | 8/2014 | Ravine .................... H04L 65/61 |
| | | | 709/206 |
| 2014/0267799 | A1 | 9/2014 | Sadasivam et al. |
| 2014/0355823 | A1 | 12/2014 | Kwon et al. |
| 2016/0125232 | A1 | 5/2016 | Zhang |
| 2017/0242471 | A1 | 8/2017 | Ma |
| 2018/0150317 | A1 * | 5/2018 | Kuo ........................ H04L 67/55 |
| 2019/0065833 | A1 * | 2/2019 | Wang ..................... G06V 20/46 |
| 2019/0146991 | A1 | 5/2019 | Sato |
| 2019/0272289 | A1 | 9/2019 | Choi et al. |
| 2020/0038299 | A1 | 2/2020 | Hitchcock-Agostino et al. |
| 2021/0067684 | A1 | 3/2021 | Kim et al. |

FOREIGN PATENT DOCUMENTS

| | | | |
|---|---|---|---|
| JP | 2017220085 | A | 12/2017 |
| KR | 100601997 | B1 | 7/2006 |
| KR | 101372860 | B1 | 3/2014 |
| KR | 101417548 | B1 | 7/2014 |
| KR | 101428715 | B1 | 8/2014 |
| KR | 101563238 | B1 | 11/2015 |
| KR | 20150131202 | A | 11/2015 |
| KR | 101608248 | B1 | 4/2016 |
| KR | 20160088224 | A | 7/2016 |
| KR | 10-2019-0106863 | A | 9/2019 |
| KR | 20190134920 | A | 12/2019 |
| KR | 20190143548 | A | 12/2019 |
| KR | 10-2061567 | | 1/2020 |

OTHER PUBLICATIONS

Korean Office Action issued Mar. 4, 2025 in corresponding Korean Patent Application No. 10-2021-0004243.
Extended European Search Report dated Aug. 22, 2024 issued in European Patent Application No. 21919788.6.
Abbasi et al., "Large Scale Tag Recommendation Using Different Image Representations", 2009, 12 pages.
Ayoub et al., "Personalized Social Image Organization, Visualization, And Querying Tool using Low-and High-Level Features", 2016 IEEE Conference, 8 pages.
Yoon et al., "Similarity Measure of the Visual Features Using the Constrained Hierarchical Clustering for Content Based Image Retrieval", 2008, 9 pages.
Wang et al., "Who is here:Location Aware Face Recognition", Nov. 6, 2012, 5 pages.
Wang et al., "Informative image selection for crowdsourcing-based mobile location recognition", Jul. 25, 2017, 11 pages.
Ji et al., "Key-frame extraction for video captured by smart phones", Dec. 2013, 6 pages.
Angladon et al. "The toulouse vanishing points dataset", Mar. 18-20, 2015, 6 pages.
Takacs et al., "Outdoors augmented reality on mobile phone using loxel-based visual feature organization", Oct. 30-31, 2008, 8 pages.
Venkatagiri et al., "Automated Link Generation for Sensor-Enriched Smartphone Images", Oct. 2015, 25 pages.
Partial Supplementary European Search Report dated Apr. 15, 2024 issued in European Patent Application No. 21919788.6.
Korean Office Action dated Nov. 19, 2025 for KR Application No. 10-2021-0004243.

* cited by examiner

Figure 3:
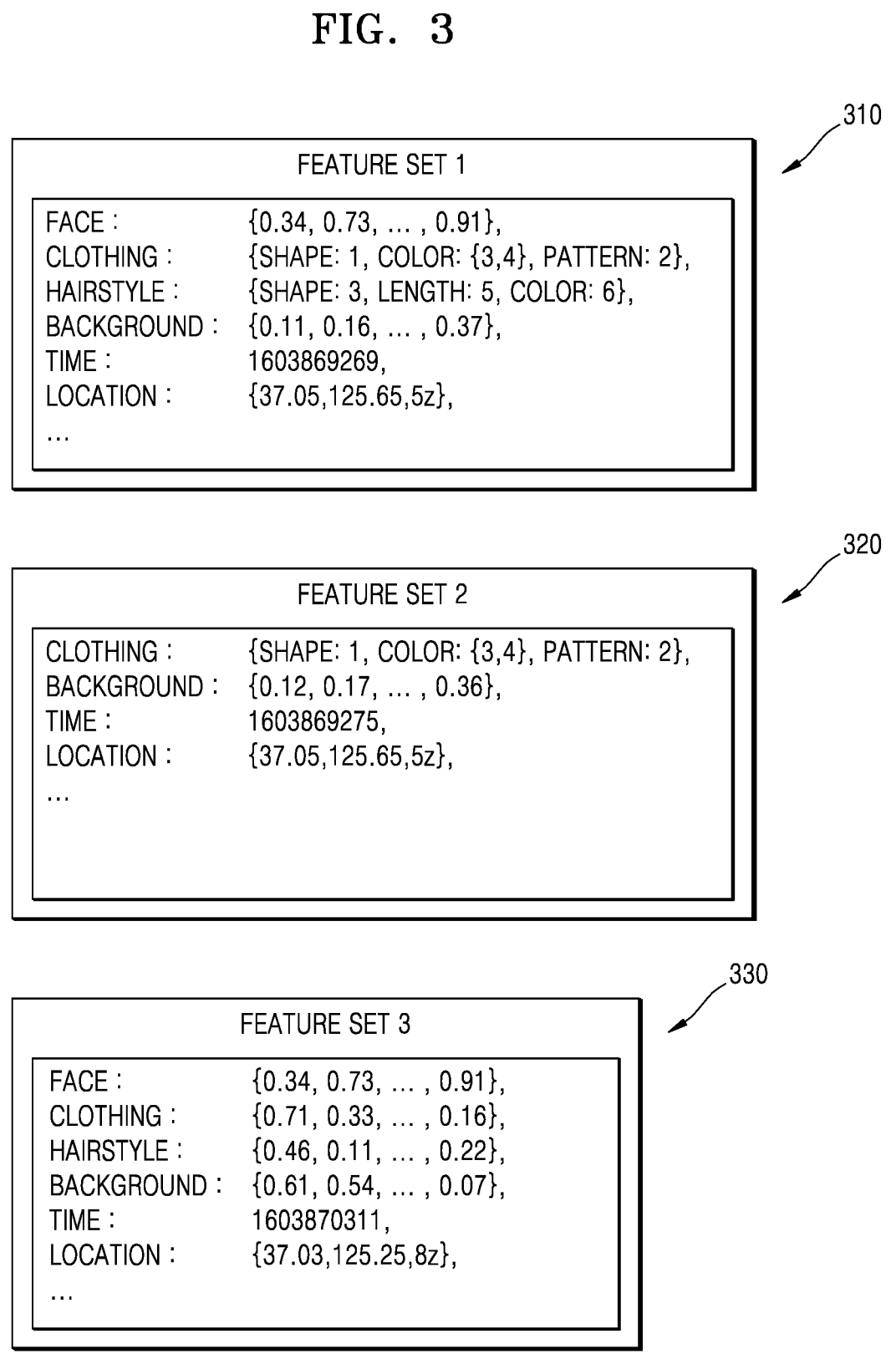

FEATURE SET 1

| | |
|---|---|
| FACE : | {0.34, 0.73, ... , 0.91}, |
| CLOTHING : | {SHAPE: 1, COLOR: {3,4}, PATTERN: 2}, |
| HAIRSTYLE : | {SHAPE: 3, LENGTH: 5, COLOR: 6}, |
| BACKGROUND : | {0.11, 0.16, ... , 0.37}, |
| TIME : | 1603869269, |
| LOCATION : | {37.05,125.65,5z}, |
| ... | |

320

FEATURE SET 2

| | |
|---|---|
| CLOTHING : | {SHAPE: 1, COLOR: {3,4}, PATTERN: 2}, |
| BACKGROUND : | {0.12, 0.17, ... , 0.36}, |
| TIME : | 1603869275, |
| LOCATION : | {37.05,125.65,5z}, |
| ... | |

330

FEATURE SET 3

| | |
|---|---|
| FACE : | {0.34, 0.73, ... , 0.91}, |
| CLOTHING : | {0.71, 0.33, ... , 0.16}, |
| HAIRSTYLE : | {0.46, 0.11, ... , 0.22}, |
| BACKGROUND : | {0.61, 0.54, ... , 0.07}, |
| TIME : | 1603870311, |
| LOCATION : | {37.03,125.25,8z}, |
| ... | |

INFORMATION ACQUISITION METHOD BASED ON ALWAYS-ON CAMERA

CROSS-REFERENCE TO RELATED APPLICATIONS

This application is a continuation of International Application No. PCT/KR2021/001381 designating the United States, filed on Feb. 2, 2021, in the Korean Intellectual Property Receiving Office and claiming priority to Korean Patent Application No. 10-2021-0004243, filed on Jan. 12, 2021, in the Korean Intellectual Property Office, the disclosures of which are incorporated by reference herein in their entireties.

BACKGROUND

Field

The disclosure relates to a method of obtaining information based on an always-on camera and an electronic device thereof.

Description of Related Art

In order for a mobile electronic device to provide a personalized service and a security service, it is essential to continuously obtain information about a user of the electronic device. However, because the acquisition of the information about the user of the electronic device is based on the user's input, the information about the user may be obtained only when the user directly inputs the information. Also, even when the user does not use the electronic device, it is possible to analyze various sensor data, but it is difficult to directly relate the sensor data to the user. In particular, because it is difficult for the electronic device to determine whether information obtained when a person other than the user uses the electronic device is the information about the user, information about other people may act as noise when a user input-based application is executed.

SUMMARY

Embodiments of the disclosure provide a method of obtaining information based on an always-on camera and an electronic device thereof.

According to an example embodiment of the disclosure, a method performed by an electronic device includes: obtaining image data using an always-on camera, obtaining sensor data, obtaining combined data from the image data and the sensor data based on an obtained time of the image data and an obtained time of the sensor data, extracting at least one feature based on the combined data, generating and storing at least one feature set based on the at least one feature, performing clustering on the at least one feature set, and storing a result of performing the clustering.

According to an example embodiment of the disclosure, the method may further include: identifying whether the electronic device is in an idle state based on the at least one feature, and determining whether to store the generated at least one feature set based on a result of the identifying.

According to an example embodiment of the disclosure, the clustering may be performed based on a number of feature sets on which clustering has not been performed, from among feature sets stored in the electronic device, being equal to or greater than a specified value.

According to an example embodiment of the disclosure, the performing of the clustering on the at least one feature set may include: performing first clustering on the at least one feature set based on a first feature from among the at least one feature, generating at least one of a person identifier (ID) and a cluster ID corresponding to a cluster generated as a result of performing the first clustering, and performing second clustering on the at least one feature set based on a second feature from among the at least one feature.

According to an example embodiment of the disclosure, the person ID may be generated based on a face feature from among the at least one feature.

According to an example embodiment of the disclosure, the method may further include: obtaining new image data, extracting at least one feature based on the new image data, generating at least one new feature set based on the at least one feature of the new image data, and comparing the at least one new feature set with the at least one feature set.

According to an example embodiment of the disclosure, the method may further include: generating, as a representative feature set, a feature set having a high correlation with a plurality of feature sets of a cluster generated as the result of performing the clustering, wherein the representative feature set is a feature set selected from among the plurality of feature sets or a feature set in which features are combined to have a high correlation with the plurality of feature sets.

According to an example embodiment of the disclosure, the method may further include: obtaining new image data, extracting at least one feature based on the new image data, generating at least one new feature set based on the at least one feature of the new image data, and comparing the at least one new feature set with at least one of the representative feature set and the at least one feature set.

According to an example embodiment of the disclosure, the method may further include determining a period in which the image data is obtained from the always-on camera.

According to an example embodiment of the disclosure, it may be identified whether the electronic device is in an idle state based on the at least one feature, and the period in which the image data is obtained may be determined based on a result of the identifying.

According to an example embodiment of the disclosure, the period in which the image data is obtained may be determined based on whether a new cluster is generated as the result of performing the clustering.

According to an example embodiment of the disclosure, an electronic device includes: an always-on camera, at least one sensor, a memory in which at least one instruction is stored, and at least one processor configured to execute the at least one instruction, to: obtain image data using the always-on camera, obtain sensor data using the at least one sensor, obtain combined data from the image data and the sensor data based on an obtained time of the image data and an obtained time of the sensor data, extract at least one feature, based on the combined data, generate and store at least one feature set based on the at least one feature, perform clustering on the at least one feature set, and store a result of performing the clustering.

According to an example embodiment of the disclosure, the at least one processor may be further configured to: identify whether the electronic device is in an idle state based on the at least one feature, and determine whether to store the generated at least one feature set based on a result of the identifying.

According to an example embodiment of the disclosure, the at least one processor may be further configured to: perform the clustering based on a number of feature sets on which clustering has not been performed from among feature sets stored in the electronic device being equal to or greater than a pre-determined value.

According to an example embodiment of the disclosure, the at least one processor may be further configured to: based on performing the clustering on the at least one feature set, perform first clustering on the at least one feature set based on a first feature from among the at least one feature, generate at least one of a person identifier (ID) and a cluster ID corresponding to a cluster generated as a result of performing the first clustering, and perform second clustering on the at least one feature set based on a second feature from among the at least one feature.

According to an example embodiment of the disclosure, the at least one processor may be further configured to: generate a feature set having a high correlation with a plurality of feature sets of a cluster generated as the result of performing the clustering as a representative feature set, wherein the representative feature set is a feature set selected from among the plurality of feature sets or a feature set in which features are combined to have a high correlation with the plurality of feature sets.

According to an example embodiment of the disclosure, the at least one processor may be further configured to: determine a period in which a data processing module in the electronic device requests the always-on camera for the image data.

According to an example embodiment of the disclosure, the at least one processor may be further configured to: identify whether the electronic device is in an idle state based on the at least one feature, and determine the period in which the image data is requested based on a result of the identifying.

According to an example embodiment of the disclosure, the at least one processor may be further configured to determine the period in which the image data is requested, based on whether a new cluster is generated as the result of performing the clustering.

According to an example embodiment of the disclosure, there is provided a non-transitory computer-readable medium having recorded thereon a program for executing, on a computer, the method performed by the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a diagram illustrating an example feature and a feature set, according to various embodiments;

FIGS. 6A and 6B are diagrams illustrating an example process in which an electronic device performs clustering, according to various embodiments;

FIG. 7 is a diagram illustrating an example process in which an electronic device generates a representative feature set, according to various embodiments;

DETAILED DESCRIPTION

Figure 1:
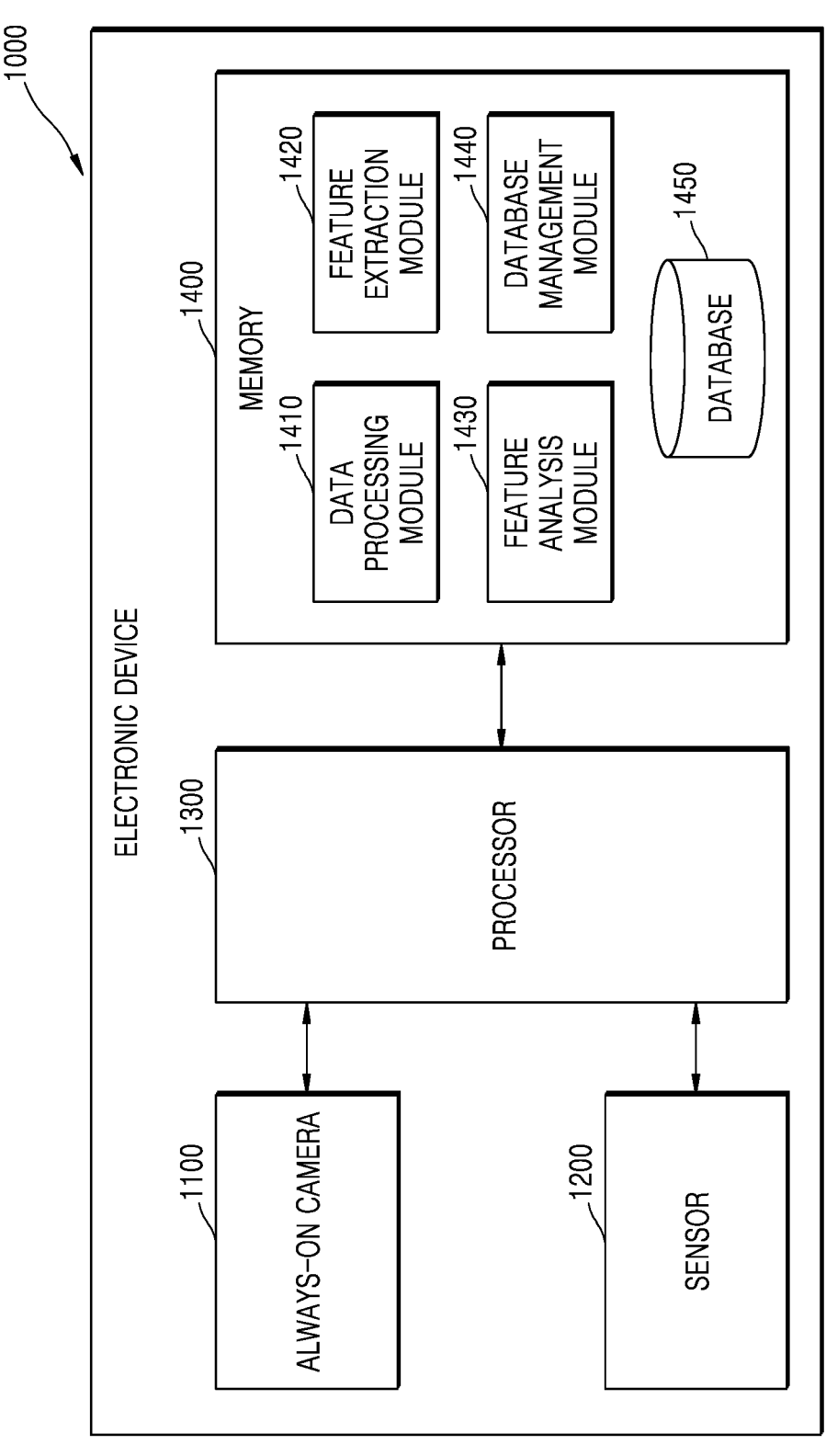
FIG. 1 is a block diagram illustrating an example configuration of an electronic device, according to various embodiments.

Hereinafter, various example embodiments of the present disclosure will be described in greater detail with reference to the accompanying drawings.

In the following description, descriptions of techniques that are well known in the art and not directly related to the present disclosure may be omitted. This is to clearly convey the gist of the present disclosure by omitting an unnecessary description.

For the same reason, some elements in the accompanying drawings are exaggerated, omitted, or schematically illustrated. Also, the size of each element may not substantially reflect its actual size. In the drawings, the same or corresponding elements are denoted by the same reference numerals.

The advantages and features of the present disclosure, and methods of achieving the same, will become apparent with reference to various example embodiments of the present disclosure described below in detail in conjunction with the accompanying drawings. In this regard, the embodiments of the present disclosure may have different forms and should not be construed as being limited to the descriptions set forth herein. Rather, these embodiments are provided so that this disclosure will be thorough. In the disclosure, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for performing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instructions for performing the functions stored in the flowchart block(s). Because the computer program instructions may also be loaded into a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Each block may represent a module, segment, or portion of code, which includes at least one executable instruction for implementing specified logical function(s). It should also be noted that in various implementations, the functions noted in the blocks may occur out of the order. For example, two blocks shown in succession may in fact be executed substantially concurrently or the blocks may sometimes be executed in the reverse order, depending upon the functionality involved.

In the present disclosure, an always-on camera may refer, for example, to a camera that continuously obtains image data in a specific period or a camera that may always be used to obtain image data. However, the always-on camera does not literally mean that the camera may not be turned off, and does not mean that the camera is always on.

In the present disclosure, an identifier (ID) may refer, for example, to a name for identifying and distinguishing a certain object. A cluster ID may refer, for example, to a name for identifying a specific cluster, and a different cluster ID may be assigned to each cluster. A person ID may refer, for example, to a name for identifying a specific person, and may be assigned based on the person's face feature. According to an embodiment, there is only one person ID corresponding to a specific person, but there may be one or more cluster IDs corresponding to the specific person.

Hereinafter, various example embodiments of the present disclosure will be described in greater detail with reference to the accompanying drawings.

FIG. 1 is a block diagram illustrating an example configuration of an electronic device 1000, according to various embodiments.

According to an embodiment, the electronic device 1000 may include an always-on camera 1100, a sensor 1200, a processor (e.g., including processing circuitry) 1300, and a memory 1400. However, elements of the electronic device 1000 are not limited thereto, and the electronic device 1000 may include more or fewer elements.

The always-on camera 1100 may obtain image data. Even when a user does not use a camera, the electronic device 1000 may continuously obtain image data by using the always-on camera. Accordingly, the electronic device 1000 may obtain image data at a desired time point without a preparation time required to drive the camera.

The sensor 1200 may obtain sensor data. The sensor 1200 may include at least one of, but not limited to, a global positioning system (GPS) sensor, a tilt sensor, a geomagnetic sensor, an acceleration sensor, and a gyro sensor.

The processor 1300 may include various processing circuitry and control an overall operation of the electronic device 1000 by executing at least one instruction in the memory 1400.

For example, the processor 1300 may obtain combined data from the image data and the sensor data, based on an obtained time of the image data and an obtained time of the sensor data. Also, the processor 1300 may extract at least one feature and may generate and store at least one feature set, based on the combined data.

The processor 1300 may identify whether the electronic device 1000 is in an idle state based on the at least one feature, and may determine whether to store the at least one feature set based on an identification result.

The processor 1300 may perform clustering on the feature set, and may store a clustering execution result. Also, the processor 1300 may generate a feature set having a high correlation with a plurality of feature sets in a cluster generated as a clustering execution result as a representative feature set.

The processor 1300 may obtain new image data, and may extract at least one feature based on the obtained image data. Also, the processor 1300 may generate at least one new feature set based on the at least one feature of the new image data, and may compare the generated at least one new feature set with the feature set or the representative feature set stored in a database 1450.

The processor 1300 may determine a period in which a data processing module 1410 in the electronic device 1000 requests the always-on camera 1100 for image data.

The memory 1400 may include various modules configured to be executed by the processing circuitry of the processor 1300 and may include various program instructions, including, for example, the data processing module 1410, a feature extraction module 1420, a feature analysis module 1430, a database management module 1440, and the database 1450.

The data processing module 1410 may store instructions for requesting the always-on camera 1100 and the sensor 1200 for data, determining a period in which image data is requested, combining the received image data and sensor data into one data, and identifying an idle state of the electronic device 1000.

The feature extraction module 1420 may store instructions for extracting a feature based on the received image data and generating a feature set.

The feature analysis module 1430 may store instructions for performing clustering on the feature set, generating a representative feature set, and comparing the feature set.

The database management module 1440 may store instructions for transmitting/receiving a request or data with the feature analysis module 1430 or the database 1450.

The database 1450 may store at least one of a person ID, a cluster ID, and a representative feature set or at least one feature set.

Figure 2:
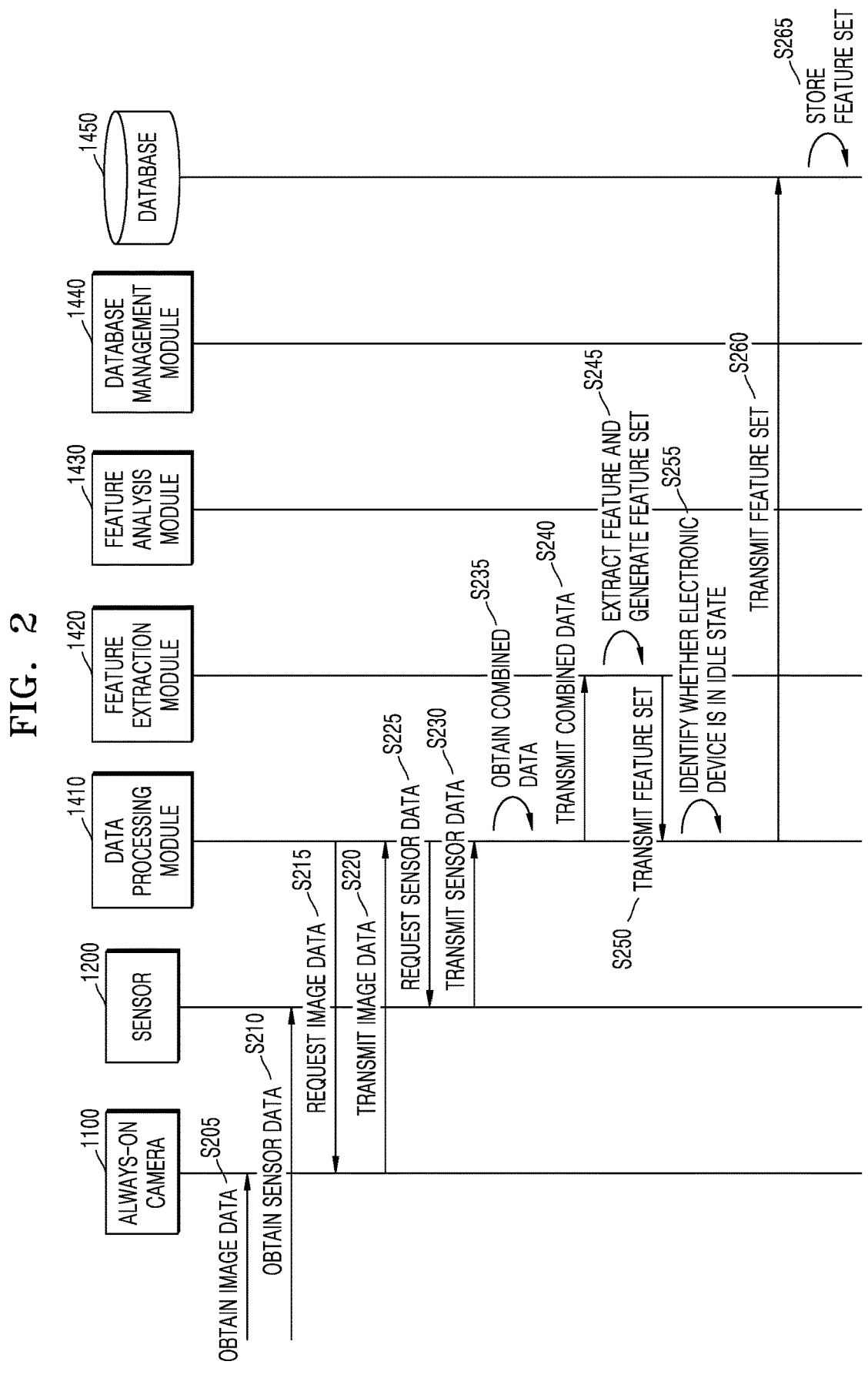
FIG. 2 is a signal flow diagram illustrating an example process in which an electronic device stores a feature set, according to various embodiments.

FIG. 2 is a signal flow diagram illustrating an example process in which the electronic device 1000 stores a feature set, according to various embodiments.

Referring to FIG. 2, in operation S205, the always-on camera 1100 may obtain image data. In this case, the image data obtained by the always-on camera 1100 may be one or more photos or videos.

In operation S210, the sensor 1200 may obtain sensor data. In this case, the sensor data obtained by the sensor 1200 may include information about a location or movement of the electronic device 1000.

Although the always-on camera 1100 obtains image data and then the sensor 1200 obtains sensor data in FIG. 2, in an embodiment, the sensor 1200 may obtain sensor data and then the always-on camera 1100 may obtain image data. According to an embodiment, the always-on camera 1100 and the sensor 1200 may obtain image data and sensor data at the same time.

In operation S215, the data processing module 1410 may request the always-on camera 1100 for the image data.

In operation S220, the always-on camera 1100 may transmit the obtained image data to the data processing module 1410. In this case, a period in which the data processing module 1410 requests the always-on camera 1100 for the image data may be changed, which will be described below in detail with reference to FIG. 9.

In operation S225, the data processing module 1410 may request the sensor 1200 for the sensor data.

In operation S230, the sensor 1200 may transmit the obtained sensor data to the data processing module 1410.

Although the data processing module 1410 requests the always-on camera 1100 for the image data and then requests the sensor 1200 for the sensor data in FIG. 2, in an embodiment, the data processing module 1410 may request the sensor 1200 for the sensor data and then may request the always-on camera 1100 for the image data. Also, although the sensor 1200 obtains the sensor data and then the data processing module 1410 requests the always-on camera 1100 for the image data in FIG. 2, in an embodiment, the data processing module 1410 may request the always-on camera 1100 for the image data and then the sensor 1200 may obtain the sensor data.

In operation S235, the data processing module 1410 may obtain combined data from the image data and the sensor data, based on an obtained time of the image data and an obtained time of the sensor data. According to an embodiment, the data processing module 1410 may combine sensor data obtained within a certain time interval from the obtained time of the image data with the image data. In this case, the certain time interval may be pre-defined, or may be changed based on a user input. For example, when the image data is obtained at a specific time, the data processing module 1410 may combine GPS data obtained within 5 seconds from the specific time with the image data.

According to an embodiment, the data processing module 1410 may pre-process the image data, to more easily extract a feature from the image data.

In operation S240, the data processing module 1410 may transmit the combined data to the feature extraction module 1420.

In operation S245, the feature extraction module 1420 may extract least one feature and may generate at least one feature set, based on the combined data received from the data processing module 1410. The feature and the feature set will be described below with reference to FIG. 3.

In operation S250, the feature extraction module 1420 may transmit the generated at least one feature set to the data processing module 1410.

In operation S255, the data processing module 1410 may identify whether the electronic device 1000 is in an idle state, based on a feature included in the received at least one feature set. According to an embodiment, the idle state may refer to a state in which the electronic device 1000 is not used by a user.

According to an embodiment, the data processing module 1410 may identify whether the electronic device 1000 is in an idle state, based on a feature related to the sensor data. For example, the data processing module 1410 may identify whether the electronic device 1000 is placed on a flat floor based on the feature related to the sensor data obtained by using a tilt sensor. When the data processing module 1410 identifies that the data processing module 1410 is placed on a flat floor, the data processing module 1410 may determine that the electronic device 1000 is in an idle state.

According to an embodiment, the data processing module 1410 may identify whether the electronic device 1000 is in an idle state, based on a feature related to the image data. For example, the data processing module 1410 may identify whether a feature related to a person (e.g., a face feature, a hairstyle feature, a clothing feature, or a physical condition feature) from among the feature related to the image data is included in the feature set. When the data processing module 1410 identifies that the feature set does not include a feature related to a person, the data processing module 1410 may determine that the electronic device 1000 is in an idle state.

According to an embodiment, the data processing module 1410 may determine a period in which the image data is requested to the always-on camera 1100 based on an identification result, which will be described below with reference to FIG. 9.

In operation S260, when the data processing module 1410 identifies in operation S255 that the electronic device 1000 is not in an idle state, the data processing module 1410 may transmit the at least one feature set to the database 1450. When the data processing module 1410 identifies in operation S255 that the electronic device 1000 is in an idle state, the data processing module 1410 may not transmit the at least one feature set to the database 1450.

In operation S265, the at least one feature set may be stored in the database 1450.

FIG. 3 is a diagram illustrating an example feature and an example feature set (group), according to various embodiments. Hereinafter, an operation of the feature extraction module 1420 will be described with reference to FIG. 3.

The feature extraction module 1420 may extract a feature corresponding to an individual element such as a person's face, clothing, or hairstyle, or a background, based on image data among combined data. According to an embodiment, when there are two or more people in image data, the feature extraction module 1420 may extract only a feature related to a person identified as located close to the electronic device 1000. When an individual element is covered by another object or is located outside a field of view (FOV) of the always-on camera 1100, a feature corresponding to the element may not be extracted.

According to an embodiment, a type of a feature corresponding to an individual element may be pre-defined. For example, a type of a feature related to image data may be at least one of, but not limited to, a face feature, a clothing feature, a hairstyle feature, a physical condition feature (e.g., a face size, a neck length, or a shoulder width), and a background feature. Also, a type of a feature related to sensor data may be defined according to a type of the sensor 1200 of the electronic device 1000.

A "feature" of the present disclosure may be expressed as a feature vector or a pre-defined (e.g., specified) category. According to an embodiment, a feature vector may be extracted as a multi-dimensional vector, based on a feature extraction algorithm. In a process of training the feature extraction algorithm, the feature extraction algorithm may be trained to have a high correlation between similar features. In more detail, the feature extraction algorithm may be trained to output a high score when similar features are input and to output a low score when different features are input.

According to an embodiment, a feature corresponding to a type other than a face feature may be mapped to at least one category from among pre-defined feature categories. For example, a feature corresponding to a clothing feature may be mapped to a simplified clothing feature category of {clothing shape, main color, pattern} such as {T-shirt, (blue, white), horizontal stripe}.

The feature extraction module 1420 may generate a feature set as a result of extracting at least one feature. The feature set may include a feature related to image data, a feature related to sensor data, and time information. In this case, the feature related to the image data may be expressed as a feature vector, or may be expressed as a combination of a feature vector and a category.

Referring to FIG. 3, examples of a feature set as an output result of the feature extraction module 1420 are illustrated. According to an embodiment, a face feature and a background feature included in a feature set 1 310 may be expressed as a feature vector, and a clothing feature and a hairstyle feature may be expressed as a category. Also, the feature set 1 310 may include time and location features. According to an embodiment, a feature set 2 320 may not include a feature corresponding to a face feature. As described above, this may refer, for example, to a user's face being covered by another object or is outside an FOV of the always-on camera 1100. According to an embodiment, a feature related to image data included in a feature set 3 330 may all be expressed as a feature vector.

Figure 4:
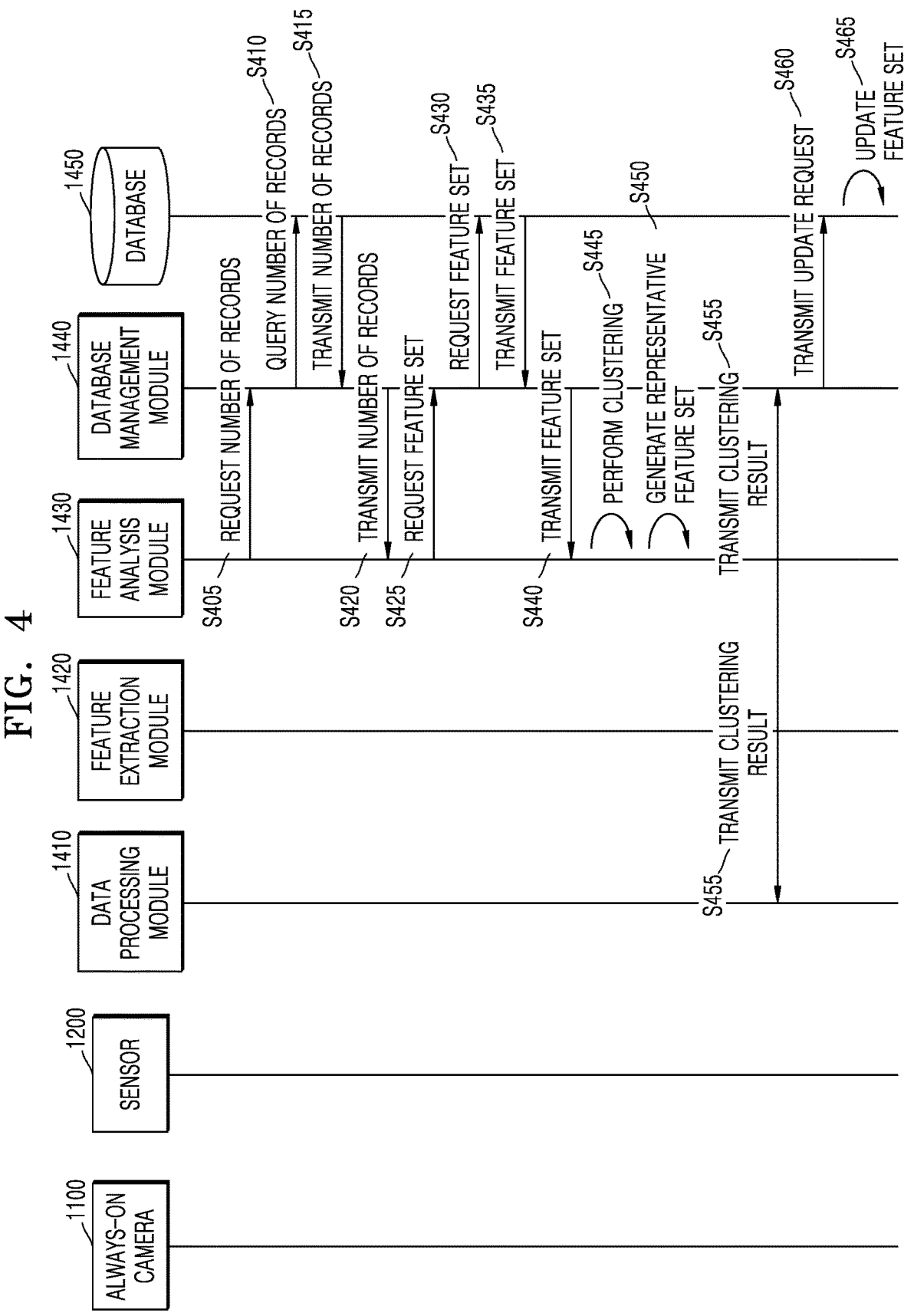
FIG. 4 is a signal flow diagram illustrating an example process in which an electronic device performs clustering, according to various embodiments.

FIG. 4 is a signal flow diagram illustrating an example process in which the electronic device 1000 performs clustering, according to various embodiments.

In operation S405, the feature analysis module 1430 may request the database management module 1440 for the number of records. A record may refer to a feature set on which clustering is not performed or a feature set to which a cluster ID is not assigned, stored in the database 1450.

In operation S410, the database management module 1440 may query the database 1450 for the number of records. In operation S415, the database 1450 may transmit a query result, that is, the number of records, to the database management module 1440. In operation S420, the database management module 1440 may transmit the received number of records to the feature analysis module 1430.

In operation S425, when the feature analysis module 1430 determines that the number of records is equal to or greater than a pre-determined (e.g., specified) value, the feature analysis module 1430 may request the database management module 1440 for a feature set. When the feature analysis module 1430 determines that the number of records is less than the pre-determined value, the feature analysis module 1430 may not request the database management module 1440 for a feature set.

According to an embodiment, the pre-determined value may be pre-defined, and may be changed based on a recent clustering result. For example, when a new cluster is generated as a recent clustering result, the pre-determined value may be reduced. Also, when a new cluster is not generated as a recent clustering result and feature sets are added or removed to or from an existing cluster, the pre-determined value may be increased.

The feature set requested by the feature analysis module 1430 to the database management module 1440 may refer to a feature set on which clustering has not been completed. According to an embodiment, a feature set on which clustering has been completed may refer to a feature set including features of all types. In this case, a type of a feature may be pre-defined as described above.

According to an embodiment, even after a certain period of time elapses after a cluster including a feature of a main type is generated, in a case that a feature set including a feature of a new type is not added to the cluster, the feature analysis module 1430 may determine that clustering on a feature set included in the cluster has been completed. In this case, the certain period of time and the main type may be pre-defined, and may be changed based on a user input. For example, 10 minutes may be pre-defined as the certain period of time, and a face feature and a GPS feature may be pre-defined as the main type. In this case, even after 10 minutes elapses after a cluster including a face feature, a hairstyle feature, and a GPS feature is generated, in a case that a feature set including a new feature is not added to the cluster, the feature analysis module 1430 may determine that clustering on a feature set included in the cluster has been completed.

According to an embodiment, when a feature of a specific type is changed between temporally adjacent clusters, the feature analysis module 1430 may determine that clustering on a feature set included in a temporally preceding cluster has been completed. For example, referring to FIG. 6A, a cluster 610 and a cluster 630 that are temporally adjacent to each other may be generated as a clustering execution result. Because a clothing feature is changed between the cluster 610 and the cluster 630, the feature analysis module 1430 may determine that clustering on a feature set included in the cluster 610 that is a temporally preceding cluster has been completed.

According to an embodiment, the feature set requested by the feature analysis module 1430 to the database management module 1440 may refer to a feature set other than a feature set on which clustering has been completed as described above from among feature sets stored in the database 1450.

In operation S430, the database management module 1440 may request the database 1450 for the feature set. In operation S435, the database 1450 may transmit the feature set to the database management module 1440. In operation S440, the database management module 1440 may transmit the received feature set to the feature analysis module 1430. According to an embodiment, the feature set in operations S430 and S440 may refer to a feature set on which clustering has not been completed.

In operation S445, the feature analysis module 1430 may perform clustering on the received feature set, which will be described below with reference to FIGS. 5 to 6B.

In operation S450, the feature analysis module 1430 may generate a representative feature set that represents a cluster generated as a clustering result, which will be described below with reference to FIG. 7.

In operation S455, the feature analysis module 1430 may transmit a clustering execution result to the data processing module 1410 and the database management module 1440. According to an embodiment, the clustering execution result transmitted to the database management module 1440 may include information about a person ID or a cluster ID corresponding to each of all feature sets on which clustering is performed. Also, when the presentative feature set is generated, the clustering execution result transmitted to the database management module 1440 may include information about the representative feature set.

According to an embodiment, the clustering execution result transmitted to the data processing module 1410 may include information about whether a new cluster is generated. In this case, the data processing module 1410 may determine a period in which image data is requested to the always-on camera 1100, based on the received the clustering execution result, which will be described below with reference to FIG. 9.

In operation S460, the database management module 1440 may transmit an update request to the database 1450, based on the received clustering result.

In operation S465, a feature set stored in the database 1450 may be updated, based on the received update request. According to an embodiment, when a feature set is updated, it may refer, for example, to a person ID or a cluster ID corresponding to each feature set being input to a feature set table or an unnecessary feature set is removed. Also, information about a cluster ID or a person ID corresponding to a newly generated cluster may be stored in a separate table.

When the representative feature set is newly generated, information about the representative feature set may be stored in a separate table.

Figure 5:
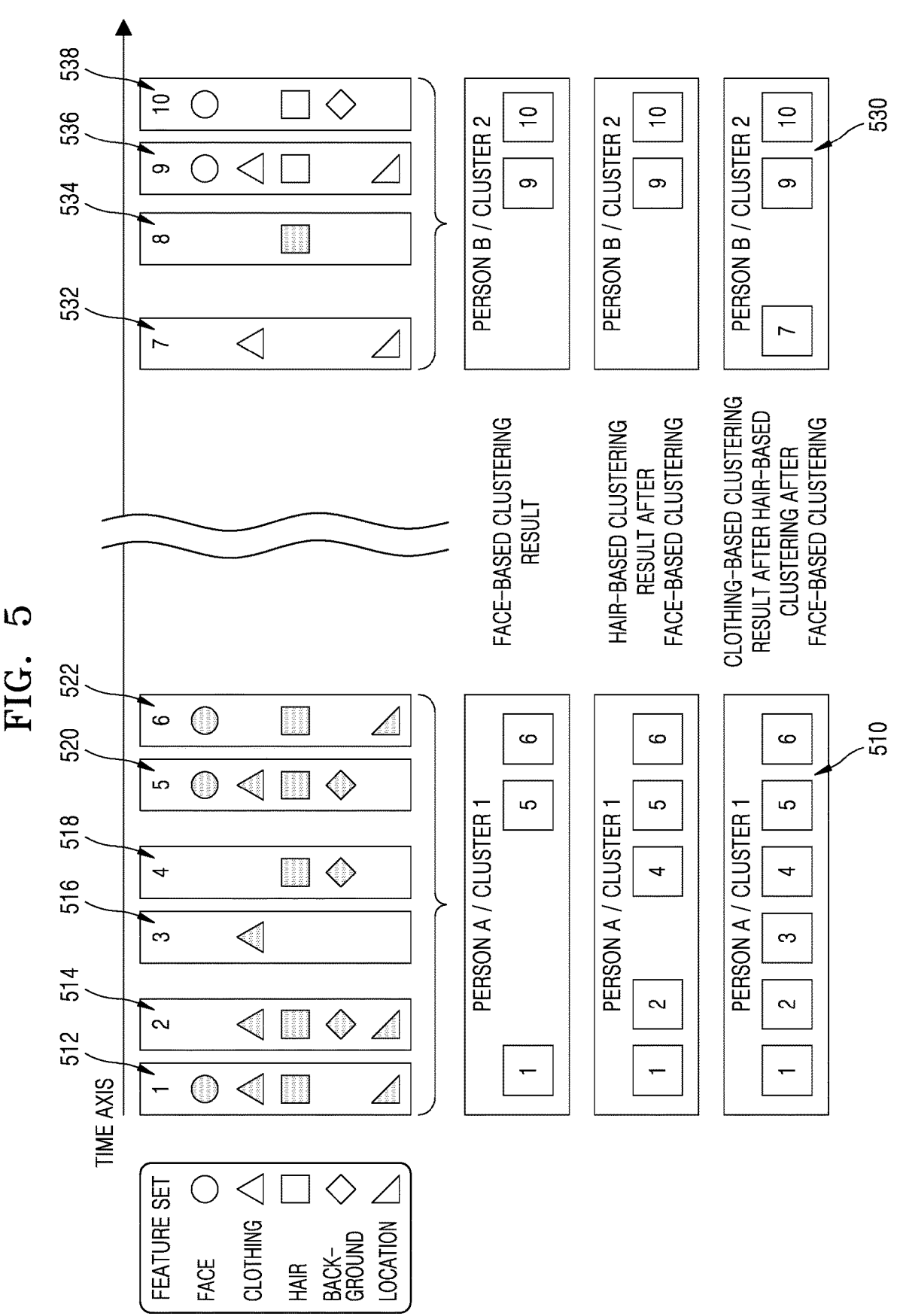
FIG. 5 is a diagram illustrating an example process in which an electronic device performs clustering, according to various embodiments.

FIG. 5 is a diagram illustrating an example process in which the electronic device 1000 performs clustering, according to various embodiments.

According to an embodiment, the feature analysis module 1430 may perform clustering on a feature set on which clustering has not been completed. Clustering may be performed by calculating a similarity between feature sets, and may use a general clustering algorithm.

According to an embodiment, there may be a priority between types of features, and clustering may be performed based on the priority. For example, a face feature may have a highest priority, and a clothing feature, a hairstyle feature, a background feature, a location feature, or a time when image data is obtained may have a low priority. In particular, features not related to a person, such as the location feature or the background feature, may have a low priority, and clustering may not be performed based only on the features. However, features not related to a person may be used as auxiliary in a feature comparison process or may be used to provide additional information about a user of the electronic device 1000. A priority between types of features may be pre-defined, and may be changed based on a user input.

Referring to FIG. 5, although a face feature, a clothing feature, a hairstyle feature, a background feature, and a location feature are illustrated as types of features included in a feature set, the present disclosure is not limited thereto. According to an embodiment, features expressed in the same color may correspond to the same person. For example, referring to FIG. 5, feature sets 1 to 6 512 to 522 may include features corresponding to a person A, and feature sets 7 to 10 532 to 538 may include features corresponding to a person B. According to an embodiment, features expressed in the same color for each type may have slightly different feature vectors, but may have a high correlation. For example, referring to FIG. 5, hairstyle features included in the feature sets 1, 2, and 4 to 6 512, 514, and 518 to 522 may have slightly different feature vectors in a shape, length, or color, but may have a high correlation.

According to an embodiment, feature sets may be sequentially stored in the database 1450 according to times when the feature sets are generated. As described above, a specific feature may not be extracted, and the unextracted feature may be expressed in an empty state. For example, referring to FIG. 5, the feature sets 1, 5, and 6 512, 520, and 522 may include a face feature, and the feature sets 2 to 4 514 to 518 may not include a face feature.

According to an embodiment, the feature analysis module 1430 may perform first clustering based on a feature having a highest priority. When the number of feature sets in a cluster is equal to or greater than a pre-determined value, the feature analysis module 1430 may generate a cluster ID and may assign the cluster ID to the cluster. In this case, the pre-determined value may be pre-defined, and may be changed based on a user input. When the cluster includes a face feature, the feature analysis module 1430 may assign a person ID based on the face feature. Next, the feature analysis module 1430 may perform second clustering based on a feature having a next priority.

For example, referring to FIG. 5, the feature analysis module 1430 may perform first clustering on a face feature having a highest priority, and may generate a cluster 510 including the feature sets 1, 5, and 6 512, 520, and 522 and a cluster 530 including the feature sets 9 and 10 536 and 538 as a result of performing the first clustering.

The feature analysis module 1430 may generate a cluster ID (cluster 1) corresponding to the cluster 510 and may assign the cluster ID to the cluster 510, and may generate a cluster ID (cluster 2) corresponding to the cluster 530 and may assign the cluster ID to the cluster 530.

The feature analysis module 1430 may generate a person ID (person A) and may assign the person ID to the cluster 510, based on the face feature included in the cluster 510. Also, the feature analysis module 1430 may generate a person ID (person B) and may assign the person ID to the cluster 530, based on the face feature included in the cluster 530.

The feature analysis module 1430 may perform second clustering based on a hairstyle feature having a next priority. As a result, the feature sets 2 and 4 514 and 518 including a hairstyle feature of the person A may be added to the cluster 510.

Although the feature set 8 534 also includes a hairstyle feature of the person A, the feature analysis module 1430 may not add the feature set 8 534 to the cluster 510, based on a time when the feature set 8 534 is generated. In more detail, because a time when the feature set 8 534 is generated is significantly different from a time when a feature set included in the cluster 510 is last generated, and a feature set including a face feature of the person A is not generated within a short time after the feature set 8 534 is generated, the feature analysis module 1430 may not add the feature set 8 534 to the cluster 510. Also, because the feature set 8 534 does not include a feature related to the person B, the feature set 8 534 may not be added to the cluster 530.

The feature analysis module 1430 may perform third clustering based on a clothing feature having a next priority. As a result, the feature set 3 516 including a clothing feature of the person A may be added to the cluster 510, and the feature set 7 532 including a clothing feature of the person B may be added to the cluster 530.

The feature set 8 534 that is not included in any cluster as a clustering execution result may be removed from the database 1450 later. The feature set 8 534 may be an error that may occur in a process of extracting a feature and generating a feature set, and may refer to a case where a result of the feature extraction module 1420 is inaccurate and thus a specific feature coincides with a feature of a person other than an original person by chance. In order to correct an error that may occur in a process of extracting a feature and generating a feature set, the feature analysis module 1430 may exclude a feature set from a clustering target, based on a time when the feature set is generated or a feature related to sensor data.

Figure 6A:
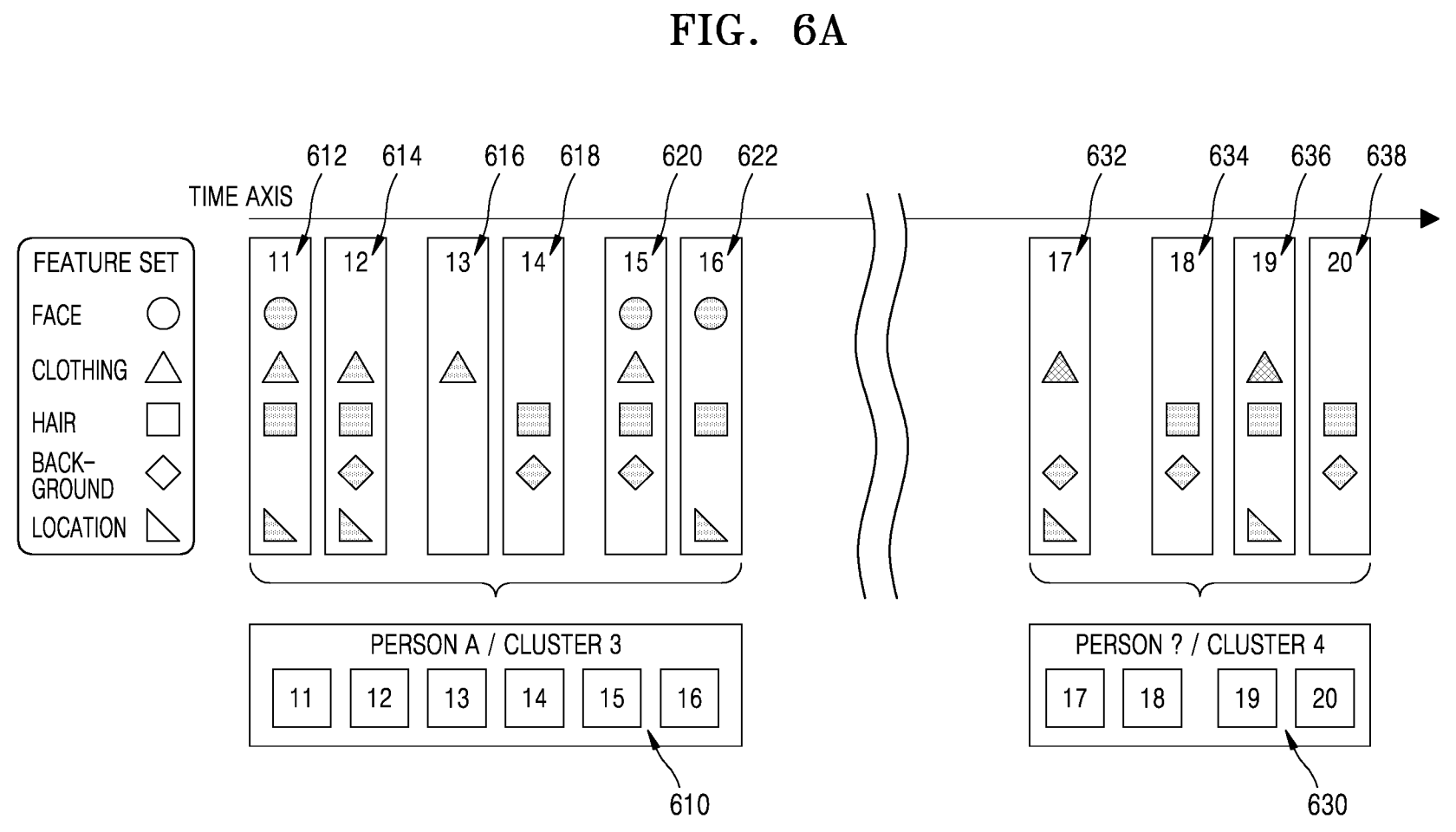
Figure 6B:
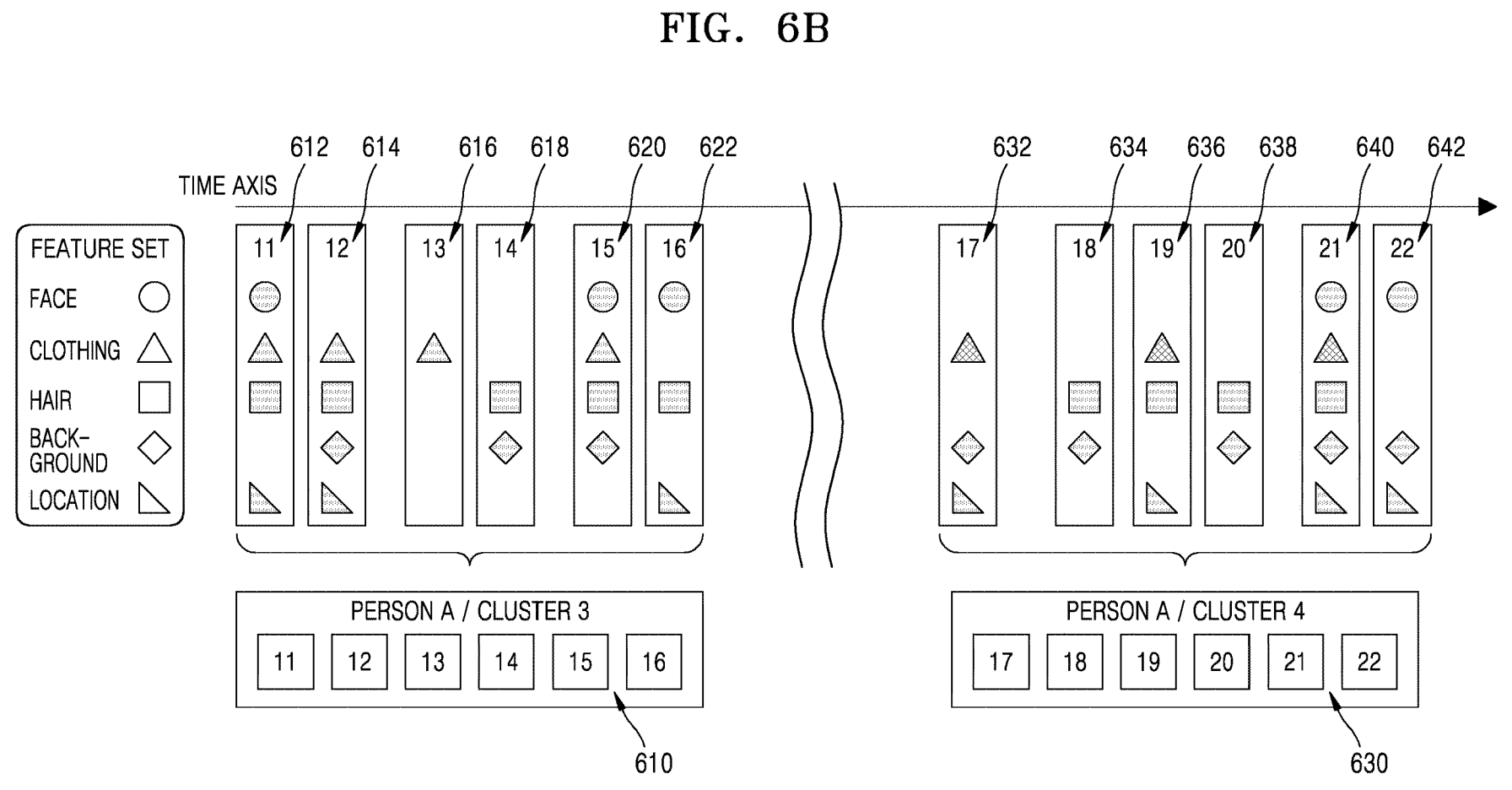

FIGS. 6A and 6B are diagrams illustrating an example process in which the electronic device 1000 performs clustering, according to various embodiments.

Referring to FIG. 6A, according to an embodiment, a cluster 610 including feature sets 11 to 16 612, 614, 616, 618, 620 and 622 and a cluster 630 including feature sets 17 to 20 632, 634, 636 and 638 may be generated as a clustering execution result. In a clustering process, the feature analysis module 1430 may generate a cluster ID (cluster 3) corresponding to the cluster 610 and may assign the cluster ID to the cluster 610, and may generate a person ID (person A) and may assign the person ID to the cluster 610 based on a face feature included in the cluster 610. Also, the feature analysis module 1430 may generate a cluster ID (cluster 4) corresponding to the cluster 630 and may assign the cluster ID to the cluster 630.

In this case, because the cluster 630 does not include a face feature, a person ID may not be assigned. In this case, the feature analysis module 1430 may determine whether to remove the feature sets 17 to 20 632 to 638 based on a subsequent feature set.

As described above, because a clothing feature is changed between the cluster 610 and the cluster 630 that are temporally adjacent to each other and generated as a clustering execution result, the feature analysis module 1430 may determine that clustering on a feature set included in the cluster 610 that is a temporally preceding cluster has been completed.

Referring to FIG. 6B, according to an embodiment, feature sets 21 and 22 640 and 642 may be newly added to the database 1450. The feature analysis module 1430 may perform clustering on the feature sets 17 to 20 632 to 638 on which clustering has not been completed and the feature sets 21 and 22 640 and 642 that are newly added. In a clustering process, the feature analysis module 1430 may add the feature sets 21 and 22 640 and 642 to the cluster 630, and may generate a person ID (person A) based on a face feature newly added to the cluster 630 and may assign the person ID to the cluster 630.

According to an embodiment, two clusters 610 and 630 having different clothing features and corresponding to the person A may be generated. This may refer, for example, to the person A changing clothing after a certain period of time elapses.

Figure 7:
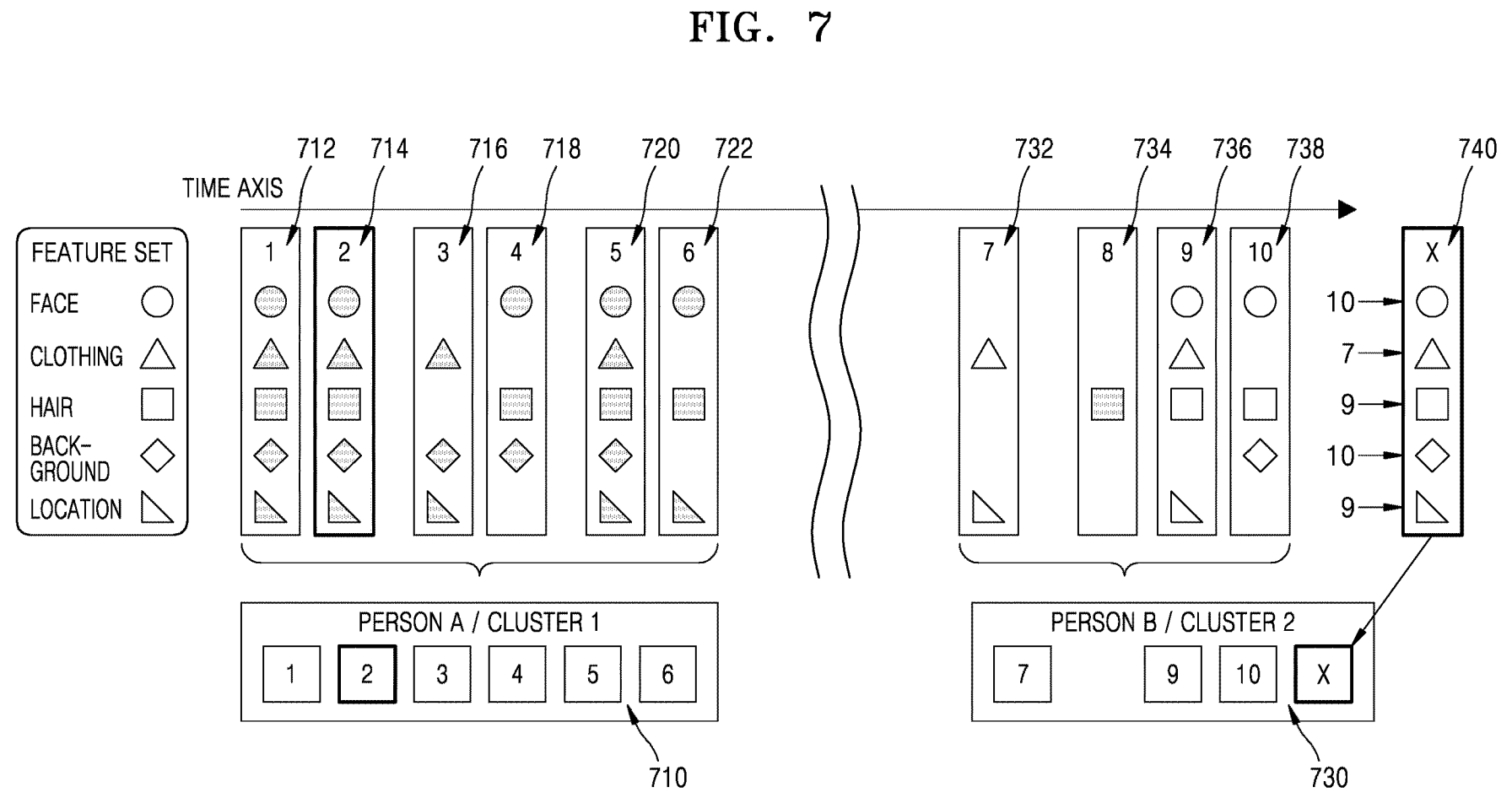

FIG. 7 is a diagram illustrating an example process in which the electronic device 1000 generates a representative feature set, according to various embodiments.

According to an embodiment, the feature analysis module 1430 may generate a representative feature set that represents each cluster generated as a clustering execution result. However, a process of generating a representative feature set may be omitted according to an embodiment.

According to an embodiment, the feature analysis module 1430 may generate a feature set having a high correlation with a plurality of feature sets in a cluster as a representative feature set. For example, the feature analysis module 1430 may select a feature set having a high correlation with other feature sets from among feature sets included in a cluster as a representative feature set. Alternatively, the feature analysis module 1430 may generate a representative feature set by combining features to have a high correlation with a plurality of feature sets in a cluster. The feature analysis module 1430 may generate a representative feature set, based on at least one of the two methods.

In this case, when a correlation is high, it may refer, for example, to when two arbitrary feature sets are input to a specific function of obtaining a correlation based on a feature vector or a feature category, a result indicating that a correlation between the two feature sets being high is output. For example, it may be assumed that a rang of a correlation function value is a real number between −1 and 1 and as the value is closer to 1, the value has a higher correlation. In this case, when a correlation with other feature sets is high, it may refer, for example, to an average or a minimum value of a correlation function value being the highest or may be pre-defined.

Referring to FIG. 7, a cluster 710 including feature sets 1 to 6 712, 714, 716, 718, 720 and 722 and a cluster 730 including feature sets 7 to 10 732, 734, 736 and 738 may be generated as a clustering execution result. According to an embodiment, the feature analysis module 1430 may select the feature set 2 714 having a high correlation with other feature sets from among the feature sets 712 to 722 included in the cluster 710 as a representative feature set. Also, the feature analysis module 1430 may generate a feature set X

740 by combining features to have a high correlation with the feature sets 732 to 738 in the cluster 730, based on correlation analysis of individual features included in the feature sets in the cluster 730. In more detail, the feature analysis module 1430 may generate the feature set X 740 based on a clothing feature of the feature set 7 732, a hairstyle feature and a location feature of the feature set 9 736, and a face feature and a background feature of the feature set 10 738.

Figure 8:
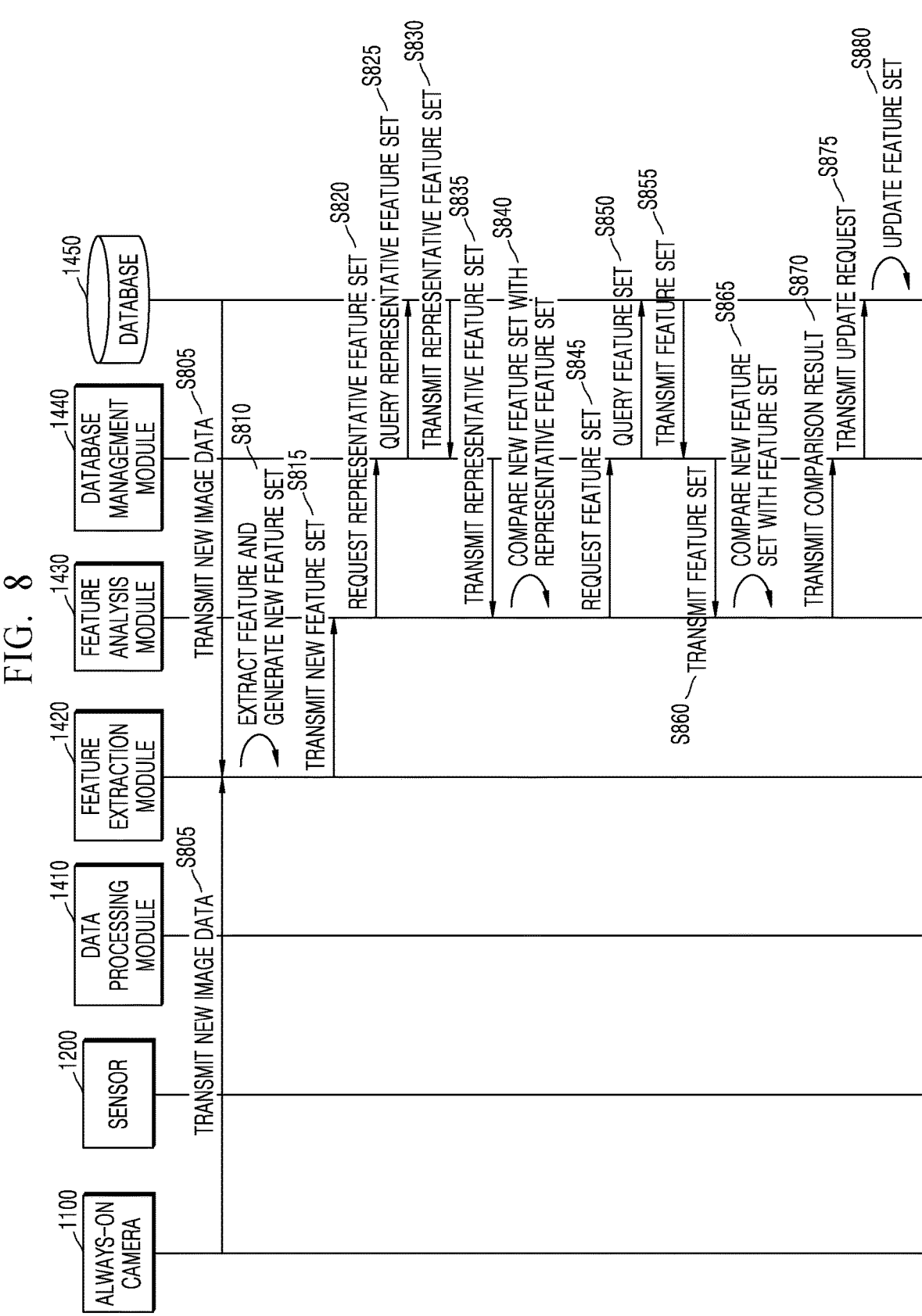
FIG. 8 is a signal flow diagram illustrating an example process in which an electronic device compares feature sets, according to various embodiments.

FIG. 8 is a signal flow diagram illustrating an example process in which the electronic device 1000 compares feature sets, according to various embodiments.

In operation S805, the database 1450 may transmit new image data stored in the database 1450 to the feature extraction module 1420. Alternatively, the always-on camera 1100 may transmit new image data to the feature extraction module 1420. In an embodiment, a module other than the database 1450 and the always-on camera 1100 may transmit new image data to the feature extraction module 1420.

In operation S810, the feature extraction module 1420 may extract at least one feature based on the received new image data, and may generate at least one new feature set. According to an embodiment, there may be a plurality of people in the received new image data. Also, a specific feature may not be extracted, and there may not be sensor data at the time when the new image data is obtained.

According to an embodiment, the feature extraction module 1420 may generate the same number of new feature sets as the number of people existing in the new image data. In this case, each new feature set may include at least one of a face feature, a clothing feature, a hairstyle feature, and a physical condition feature related to a specific person. Also, each new feature set may include a background feature or a feature related to sensor data which is commonly extracted. As a result, the new feature set may has the same form as the feature sets 310 to 330 of FIG. 3.

In operation S815, the feature extraction module 1420 may transmit the at least one new feature set to the feature analysis module 1430. However, when the at least one new feature set does not include a feature related to a person, the feature extraction module 1420 may not transmit the at least one new feature set to the feature analysis module 1430 and subsequent operations may end without being performed.

In operation S820, the feature analysis module 1430 may request the database management module 1440 for a representative feature set. In operation S825, the database management module 1440 may query the database 1450 for the representative feature set. In operation S830, the database 1450 may transmit the representative feature set to the database management module 1440. In operation S835, the database management module 1440 may transmit the received representative feature set to the feature analysis module 1430. When a process of generating the representative feature set is omitted in a process of performing clustering, operations S820 to S835 may be omitted.

In operation S840, the feature analysis module 1430 may compare the received representative feature set with the at least one new feature set. According to an embodiment, the feature analysis module 1430 may compare feature sets, based on a correlation function used in a process of performing clustering. For example, when a value of a correlation function is equal to or greater than a pre-determined value as a comparison result, the feature analysis module 1430 may determine that the new feature set includes a feature related to a person corresponding to the representative feature set. In this case, the pre-determined value may be pre-defined, and may be changed based on a user input.

When the feature analysis module 1430 identifies a correlation between the new feature set and the representative feature set, operations S845, S850, S855, S860 and S865 may be omitted and operation S870 may be performed. When the feature analysis module 1430 does not identify a correlation between the new feature set and the representative feature set, operations S845, S850, S855, S860 and S865 may be performed.

When the representative feature set is generated in a process of performing clustering, the feature analysis module 1430 may compare the new feature set with the representative feature set, thereby performing a comparison process faster than when the representative feature set is not generated.

In operation S845, the feature analysis module 1430 may request the database management module 1440 for a feature set. Operations S845 to S865 may be performed when the representative feature set is not generated, or when a correlation between the at least one new feature set and the representative feature set is not identified as a comparison result in operation S840.

In operation S850, the database management module 1440 may query the database 1450 for the feature set. According to an embodiment, when a location feature or a time when new image data is obtained is included in the new feature set, the database management module 1440 may query the database 1450 for only a feature set related to the location feature or the time. For example, the database management module 1440 may query the database 1450 for a feature set related to image data obtained on a specific date or during a specific time period.

In operation S855, the database 1450 may transmit the feature set to the database management module 1440. In operation S860, the database management module 1440 may transmit the received feature set to the feature analysis module 1430.

In operation S865, the feature analysis module 1430 may compare the received feature set with the new feature set. As described above, the feature analysis module 1430 may compare feature sets based on a correlation function used in a process of performing clustering. As a comparison result, the feature analysis module 1430 does not identify a correlation between the new feature set and the feature set, a subsequent operation may not be performed.

According to an embodiment, in a comparison process of operation S840 or S865, the feature analysis module 1430 may identify a feature set including a face feature of a user of the electronic device 1000 from among the at least one new feature set. Based on an identification result, the electronic device 1000 may determine whether there is the user in the new image data and may separately classify image data in which there is the user. Also, the feature set module 1430 may identify a feature set including other features of a cluster corresponding to the user even when a face feature of the user is not included. For example, the feature set module 1430 may identify a feature set that does not include a face feature of the user but includes the same feature as a clothing feature of the user. Alternatively, the feature set module 1430 may identify a feature set that does not include a face feature, a clothing feature, and a hairstyle feature of the user, but has the same value as a location feature of a cluster corresponding to the user or a time when image data is obtained. Based on this, the electronic device 1000 may classify the new image data into image data including a face of the user, image data including a feature other than the face of the user, or image data not including a feature of the user.

A cluster corresponding to the user may refer to a cluster to which a person ID corresponding to the user is assigned, and there may be two or more clusters. In this case, the person ID corresponding to the user may be determined based on a user input, information identified as the user in another application (e.g., unlocking through face recognition) or whether the number of feature sets related to a specific person has reached a pre-determined value. For example, when the number of feature sets related to a specific person stored in the database 1450 is equal to or greater than a pre-determined value, a person ID corresponding to the specific person may be determined to be a person ID corresponding to the user. In this case, the pre-determined value may be pre-defined, or may be changed based on a user input.

In operation S870, the feature analysis module 1430 may transmit a comparison result in operation S840 or S865 to the database management module 1440. In operation S875, the database management module 1440 may transmit an update request to the database 1450, based on the received comparison result. In operation S880, the feature set stored in the database 1450 may be updated, based on the received update request.

Figure 9:
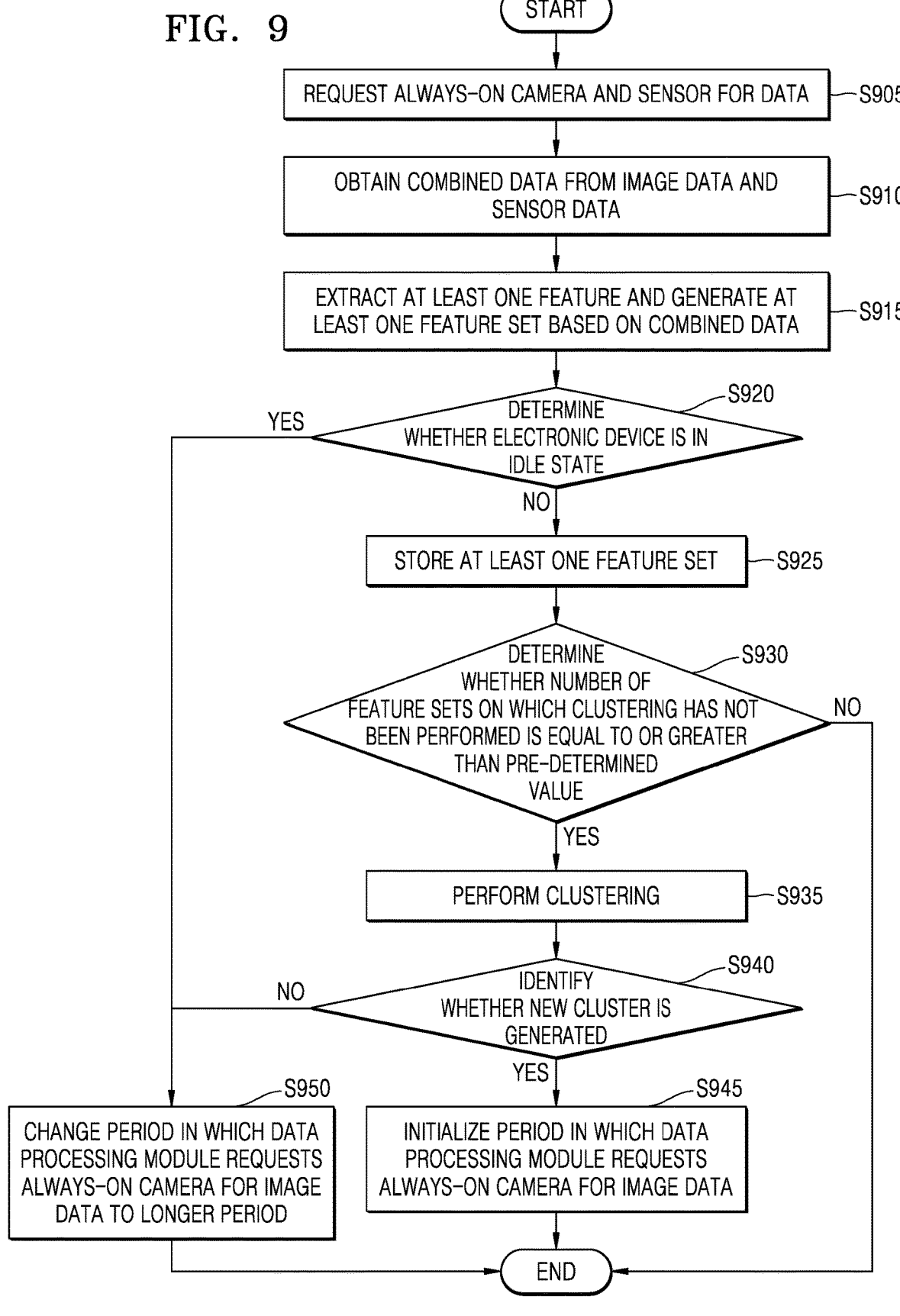
FIG. 9 is a flowchart illustrating an example process in which an electronic device determines a period in which a data management module requests an always-on camera for image data, according to various embodiments.

FIG. 9 is a flowchart illustrating an example process in which the electronic device 1000 determines a period in which the data management module 1410 requests the always-on camera 1100 for image data, according to various embodiments. Operations described below with reference to FIG. 9 may be performed in a process of performing operations of FIG. 2 or 4. The same or similar operations as those in FIG. 2 or 4 may not be described or only briefly described.

In operation S905, the data processing module 1410 may request the always-on camera 1100 and the sensor 1200 for image data and sensor data. In operation S910, the data processing module 1410 may obtain combined data from the image data and the sensor data, based on an obtained time of the image data and an obtained time of the sensor data. In operation S915, the feature extraction module 1420 may extract at least one feature and may generate at least one feature set, based on the combined data received from the data processing module 1410.

In operation S920, the data processing module 1410 may identify whether the electronic device 1000 is in an idle state based on a feature in the received at least one feature set.

In operation S925, when an identification result in operation S920 is No, the at least one feature set may be stored in the database 1450.

In operation S930, the feature analysis module 1430 may identify whether the number of feature sets on which clustering has not been performed is equal to or greater than a pre-determined value. When an identification result in operation S930 is No, subsequent operations may end without being performed.

In operation S935, when an identification result in operation S930 is Yes, the feature analysis module 1430 may perform clustering on the feature set received from the database management module 1440.

In operation S940, the feature analysis module 1430 may identify whether a new cluster is generated as a clustering execution result.

In operation S945, when an identification result in operation S940 is Yes, a period in which the data processing module 1410 requests the always-on camera 1100 for image data may be initialized. According to an embodiment, an initial value of the period in which the data processing module 1410 requests the always-on camera 1100 for image data may be pre-defined, and may be changed based on a user input.

In operation S950, when an identification result in operation S920 is Yes or an identification result in operation S940 is No, the period in which the data processing module 1410 requests the always-on camera 1100 for image data may be changed to a longer period. According to an embodiment, a maximum value of a length of the period may be pre-defined, and may be changed based on a user input.

Figure 10:
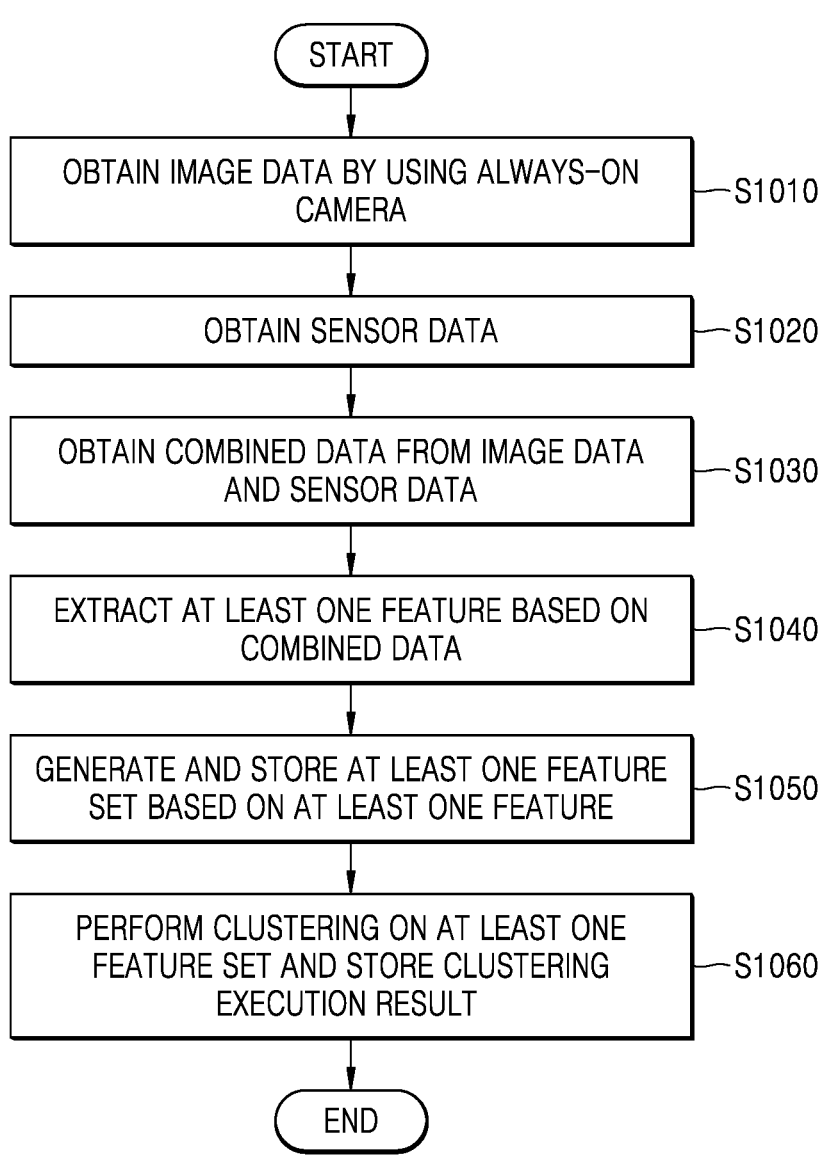
FIG. 10 is a flowchart illustrating an example process in which an electronic device obtains information based on an always-on camera, according to various embodiments.

FIG. 10 is a flowchart illustrating an example process in which an electronic device obtains information based on an always-on camera, according to various embodiments. For a brief description, the same or similar operations as those of FIG. 2 or 4 may not be described or only briefly described.

In operation S1010, an electronic device 1000 may obtain image data using an always-on camera 1100. In an embodiment, the electronic device 1000 may determine a period in which the image data is obtained from the always-on camera 1100. For example, the electronic device 1000 may identify whether the electronic device 1000 is in an idle state based on at least one feature, and may determine a period in which the image data is obtained based on an identification result. For example, the electronic device 1000 may determine a period in which the image data is obtained, based on whether a new cluster is generated, as a clustering execution result.

In operation S1020, the electronic device 1000 may obtain sensor data. In an embodiment, the sensor data may include information about a location or movement of the electronic device 1000.

In operation S1030, the electronic device 1000 may obtain combined data from the obtained image data and the obtained sensor data. In an embodiment, the electronic device 1000 may pre-process the image data, to more easily extract a feature from the image data.

In operation S1040, the electronic device 1000 may extract least one feature, based on the combined data. In an embodiment, the electronic device 1000 may extract a feature corresponding to an individual element such as a person's face, clothing, or hairstyle, or a background, based on the image data of the combined data.

In operation S1050, the electronic device 1000 may generate and store at least one feature set, based on the at least one feature. In an embodiment, the electronic device 1000 may identify whether the electronic device is in an idle state based on the at least one feature, and may determine whether to store the generated at least one feature set based on an identification result.

In operation S1060, the electronic device 1000 may preform clustering on the at least one feature set and may store a clustering execution result. In an embodiment, the electronic device 1000 may perform clustering when the number of feature sets on which clustering has not been performed from among feature sets stored in the electronic device 1000 is equal to or greater than a pre-determined value. In an embodiment, the electronic device 1000 may perform first clustering on the at least one feature set based on a first feature from among the at least one feature, may generate at least one of a person ID and a cluster ID corresponding to a cluster generated as a result of performing the first clustering, and may perform second clustering on the at least one feature set based on a second feature of the at least one feature.

In an embodiment, the electronic device 1000 may generate a feature set having a high correlation with a plurality of feature sets of a cluster generated as a clustering execution result as a representative feature set, and the representative feature set may be a feature set selected from among a plurality of feature sets or a feature set in which features are combined to have a high correlation with a plurality of feature sets.

In an embodiment, the electronic device 1000 may obtain new image data, may extract at least one feature based on the new image data, and may generate at least one new feature set based on the at least one feature of the new image data. The electronic device 1000 may compare the at least one new feature set with at least one of the representative feature set and the at least one feature set.

Figure 11:
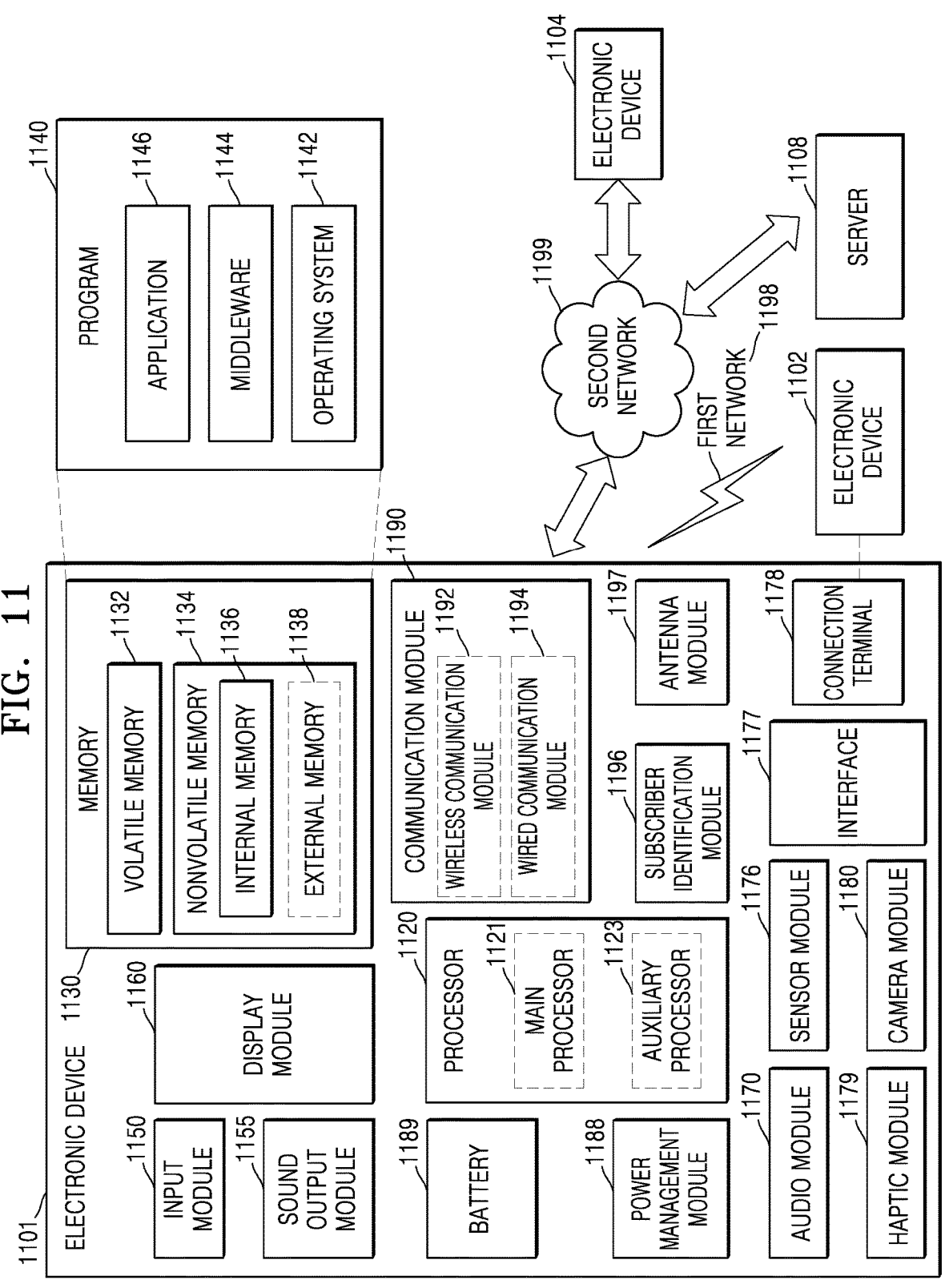
FIG. 11 is a block diagram illustrating an example electronic device in a network environment, according to various embodiments.

FIG. 11 is a block diagram illustrating an example electronic device 1101 in a network environment, according to various embodiments.

According to an embodiment, the electronic device 1101 of FIG. 11 may refer to the electronic device 1000 of FIG. 1. A camera module 1180 of FIG. 11 may refer to the always-on camera 1100, and a sensor module 1176 of FIG. 11 may refer to the sensor 1200 of FIG. 1. According to an embodiment, a processor 1120 of FIG. 11 may refer to the processor 1300 of FIG. 1, and a memory 1130 of FIG. 11 may refer to the memory 1400 of FIG. 1.

Referring to FIG. 11, in a network environment, the electronic device 1101 may communicate with an electronic device 1102 through a first network 1198 (e.g., a short-range wireless communication network), or may communicate with at least one of an electronic device 1104 or a server 1108 trough a second network 1199 (e.g., a long-range wireless communication network).

According to an embodiment, the electronic device 1101 may communicate with the electronic device 1104 through the server 1108. According to an embodiment, the electronic device 1101 may include the processor 1120, the memory 1130, an input module 1150, a sound output module 1155, a display module 1160, an audio module 1170, the sensor module 1176, an interface 1177, a connection terminal 1178, a haptic module 1179, the camera module 1180, a power management module 1188, a battery 1189, a communication module 1190, a subscriber identification module 1196, or an antenna module 1197. In various embodiments, the electronic device 1101 may omit at least one (e.g., the connection terminal 1178) of the elements of the electronic device 1101 or may add one or more other elements. In various embodiments, some of the elements (e.g., the sensor module 1176, the camera module 1180, or the antenna module 1197) may be integrated into one element (e.g., the display module 1160).

The processor 1120 may execute, for example, software (e.g., a program 1140), to control at least another element (e.g., a hardware or software component) of the electronic device 1101 connected to the processor 1120 and may perform various data processing or operations. According to an embodiment, as at least part of data processing or operation, the processor 1120 may store a command or data received from another element (e.g., the sensor module 1176 or the communication module 1190) in a volatile memory 1132, may process the command or the data stored in the volatile memory 1132, and may store result data in a nonvolatile memory 1134. According to an embodiment, the processor 1120 may include a main processor 1121 (e.g., a central processing unit or an application processor) or an auxiliary processor 1123 (e.g., a graphics processing unit, a neural processing unit (NPU), an image signal processor, a sensor hub processor, or a communication processor) that operates independently or together with the main processor 1121. For example, when the electronic device 1101 includes the main processor 1121 and the auxiliary processor 1123, the auxiliary processor 1123 may use less power than the main processor 1121 or may be set to be specialized in a designated function. The auxiliary processor 1123 may be implemented separately from or as a part of the main processor 1121.

The auxiliary processor 1123 may operate on behalf of the main processor 1121 while the main processor 1121 is in an inactive state (e.g., a sleep state) or together with the main processor 1121 while the main processor 1121 is in an active state (e.g., an application execution state), to control at least some of functions or states related to at least one (e.g., the display module 1160, the sensor module 1176, or the communication module 1190) of the elements of the electronic device 1101.

According to an embodiment, the auxiliary processor 1123 (e.g., an image signal processor or a communication processor) may be implemented as a part of another functionally related element (e.g., the camera module 1180 or the communication module 1190). According to an embodiment, the auxiliary processor 1123 (e.g., an NPU) may include a hardware structure specialized for processing an artificial intelligence (AI) model.

The AI model may be created through machine learning. Such learning may be performed on the electronic device 1101 in which the AI model is conducted, or may be performed through a separate server (e.g., the server 1108). The learning algorithm may include, but is not limited to, supervised learning, unsupervised learning, semi-supervised learning, or reinforcement learning. The AI model may include a plurality of artificial neural network layers. The artificial neural network may be, but not limited to, one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination thereof. The AI model may include a software structure, in addition or alternatively, to a hardware structure.

The memory 1130 may store various data used by at least one element (e.g., the processor 1120 or the sensor module 1176) of the electronic device 1101. The data may include input data or output data for software (e.g., the program 1140) and a related command. The memory 1130 may include the volatile memory 1132 or the nonvolatile memory 1134.

The program 1140 may be stored as software in the memory 1130, and may include, for example, an operating system 1142, middleware 1144, or an application 1146.

The input module 1150 may receive a command or data to be used by an element (e.g., the processor 1120) of the electronic device 1101 from the outside (e.g., a user) of the electronic device 1101. The input module 1150 may include, for example, a microphone, a mouse, a keyboard, keys (e.g., buttons), or a digital pen (e.g., a stylus pen).

The sound output module 1155 may output a sound signal to the outside of the electronic device 1101. The sound output module 1155 may include, for example, a speaker or a receiver. The speaker may be used for general purposes such as multimedia playback or recording playback. The receiver may be used to receive an incoming call. According to an embodiment, the receiver may be implemented separately from the speaker or as a part of the speaker.

The display module 1160 may visually provide information to the outside (e.g., the user) of the electronic device 1101. The display module 1160 may include, for example, a display, a hologram device, or a projector, and a control circuit for controlling a corresponding device. According to an embodiment, the display module 1160 may include a touch sensor configured to detect a touch, or a pressure sensor configured to measure an intensity of a force generated by the touch.

The audio module 1170 may convert sound into an electrical signal, or may convert an electrical signal into sound. According to an embodiment, the audio module 1170 may obtain sound through the input module 1150, or may output sound through the sound output module 1155 or a speaker or a headphone of an external electronic device (e.g., the electronic device 1102) wirelessly connected or directly connected to the electronic device 1101.

The sensor module 1176 may detect an operating state (e.g., power or a temperature) of the electronic device 1101 or an external environment state (e.g., a user state), and may generate an electrical signal or a data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more designated protocols that may be used to directly or wirelessly connect the electronic device 1101 to an external electronic device (e.g., the electronic device 1102). According to an embodiment, the interface 1177 may include, for example, a high-definition multimedia interface (HDMI), a universal serial bus (USB) interface, an SD card interface, or an audio interface.

The connection terminal 1178 may include a connector through which the electronic device 1101 may be physically connected to an external electronic device (e.g., the electronic device 1102). According to an embodiment, the connection terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a motion) or an electrical stimulus that may be perceived by the user through tactile or kinesthetic sense. According to an embodiment, the haptic module 1179 may include, for example, a motor, a piezoelectric element, or an electrical stimulation device.

The camera module 1180 may capture a still image and a moving image. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least a part of, for example, a power management integrated circuit (PMIC).

The battery 1189 may supply power to at least one element of the electronic device 1101. According to an embodiment, the battery 1189 may include, for example, a non-rechargeable primary cell, a rechargeable secondary cell, or a fuel cell.

The communication module 1190 may support establishment of a direct (wired) communication channel or a wireless communication channel between the electronic device 1101 and an external electronic device (e.g., the electronic device 1102, the electronic device 1104, or the server 1108), and communication through the established communication channel. The communication module 1190 may include one or more communication processors that operate independently from the processor 1120 (e.g., an application processor) and support direct (wired) communication or wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication module). A corresponding communication module from among the communication modules may communicate with the external electronic device 1104 through the first network 1198 (e.g., a short-range communication network such as Bluetooth, wireless fidelity (Wi-Fi) direct, or infrared data association (IrDA)) or the second network 1199 (e.g., a long-range communication network such as a legacy cellular network, a 5G network, a next-generation communication network, the Internet, or a computer network (e.g., a LAN or a wide area network (WAN)). The various types of communication modules may be integrated into one element (e.g., a single chip), or may be implemented as a plurality of separate elements (e.g., a plurality of chips). The wireless communication module 1192 may identify or authenticate the electronic device 1101 within a communication network such as the first network 1198 or the second network 1199 by using subscriber information (e.g., international mobile subscriber identity (IMSI)) stored in the subscriber identification module 1196.

The wireless communication module 1192 may support a 5G network after a 4G network and next-generation communication technology, for example, new radio (NR) access technology. The NR access technology may support high-speed transmission of high-capacity data (enhanced mobile broadband (eMBB)), miniaturization of terminal power and connection of multiple terminals (massive machine type communications (mMTC)), or high reliability and low latency (ultra-reliable and low-latency communications (URLLC)). The wireless communication module 1192 may support, for example, a high-frequency band (e.g., a mmWave band) to achieve a high data rate. The wireless communication module 1192 may support various technologies for ensuring performance in a high-frequency band, such as beamforming, massive multiple-input and multiple-output (MIMO), full dimensional MIMO (FD-MIMO), array antenna, analog beamforming, or large-scale antenna. The wireless communication module 1192 may support various requirements specified for the electronic device 1101, an external electronic device (e.g., the electronic device 1104), or a network system (e.g., the second network 1199). According to an embodiment, the wireless communication module 1192 may support a peak data rate for implementing eMBB (e.g., 20 Gbps or more), loss coverage for implementing mMTC (e.g., 164 dB or less), or U-plane latency for implementing URLLC (e.g., 0.5 ms or less for each of downlink (DL) and uplink (UL), or 1 ms or less for round trip).

The antenna module 1197 may transmit a signal or power to the outside (e.g., an external electronic device) or may receive a signal or power from the outside. According to an embodiment, the antenna module 1197 may include an antenna including radiator formed of a conductor or a conductive pattern formed on a substrate (e.g., a printed circuit board (PCB)). According to an embodiment, the antenna module 1197 may include a plurality of antennas (e.g., array antennas). In this case, at least one antenna suitable for a communication method used in a communication network such as the first network 1198 or the second network 1199 may be selected from among the plurality of antennas by the communication module 1190. A signal or power may be transmitted or received between the communication module 1190 and an external electronic device through the selected at least one antenna. According to a certain embodiment, a component (e.g., a radio frequency integrated circuit (RFIC)) other than the radiator may be additionally formed as a part of the antenna module 1197. According to various embodiments, the antenna module 1197 may form a mmWave antenna module. According to an embodiment, the mmWave antenna module may include a PCB, an RFIC located on or adjacent to a first surface (e.g., a bottom surface) of the PCB and capable of supporting a designated high-frequency band (e.g., mmWave band), and a plurality of antennas (e.g., array antennas) located on or adjacent to a second surface (e.g., a top surface or a side surface) of the PCB and capable of transmitting or receiving a signal of the designated high-frequency band.

At least some of the elements may be connected to each other and communicate a signal (e.g., a command or data) therebetween via an inter-peripheral communication method (e.g., a bus, general-purpose input and output (GPIO), serial peripheral interface (SPI), or mobile industry processor interface (MIPI)).

According to an embodiment, a command or data may be transmitted or received between the electronic device 1101 and the external electronic device 1104 through the server 1108 connected to the second network 1199. The external electronic device 1102 and 1104 may be the same or different type of devices as or from the electronic device 1101. According to an embodiment, all or some of operations executed by the electronic device 1101 may be executed by at least one of the external electronic devices 1102, 1104, and 1108. For example, when the electronic device 1101 should perform functions or services automatically or in response to a request from the user or another device, the electronic device 1101 may transmit a request to one or more external electronic devices to perform at least some of the functions or the services, instead of or in addition to, performing the functions or the services. The one or more external electronic devices receiving the request may execute at least some of the requested functions or services or execute additional functions or services related to the request, and may transmit an execution result to the electronic device 1101. The electronic device 1101 may provide the result, with or without further processing of the result, as at least a part of a response to the request. To this end, for example, cloud computing, distributed computing, mobile edge computing (MEC), or client-server computing technology may be used. The electronic device 1101 may provide an ultra-low latency service by using, for example, the distributed computing or MEC. In an embodiment, the external electronic device 1104 may include an Internet of things (IoT) device. The server 1108 may be an intelligent server using machine learning and/or a neural network. According to an embodiment, the external electronic device 1104 or the server 1108 may be included in the second network 1199. The electronic device 1101 may be applied to an intelligence service (e.g., a smart home, a smart city, a smart car, or health care) based on 5G communication technology and IoT-related technology.

Figure 12:
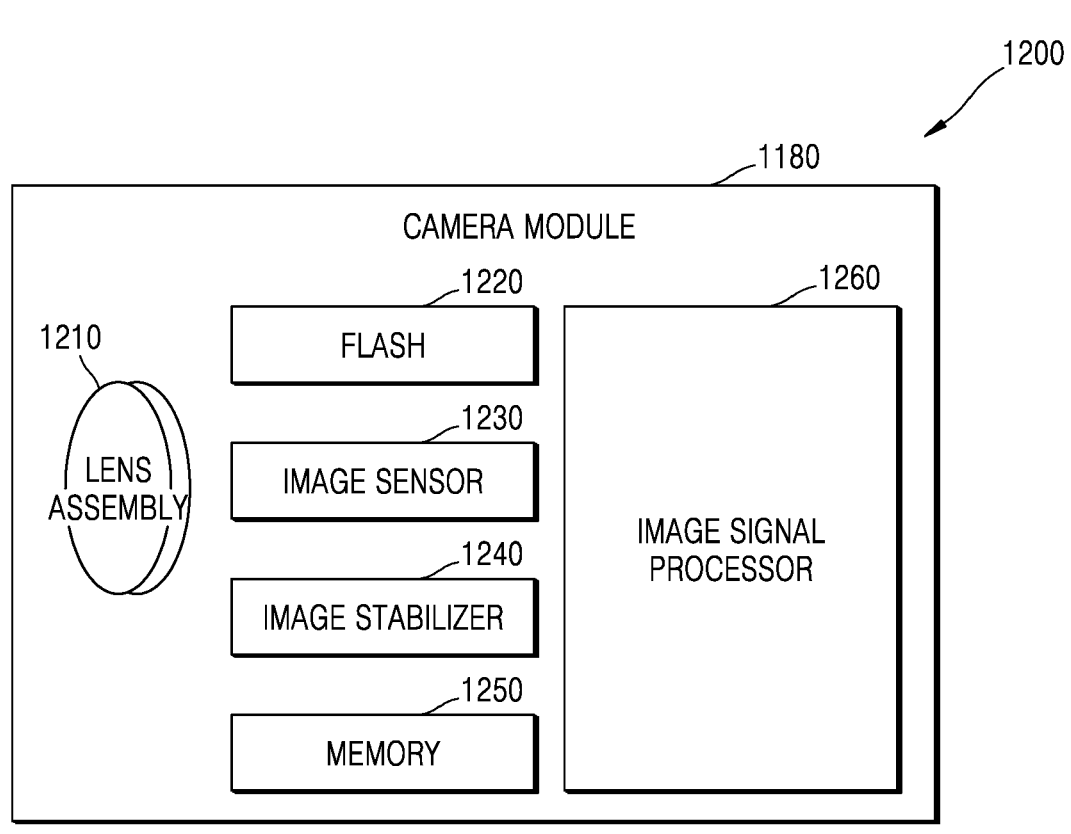
FIG. 12 is a block diagram illustrating an example configuration of a camera module, according to various embodiments.

FIG. 12 is a block diagram 1200 illustrating an example configuration of the camera module 1180, according to various embodiments.

According to an embodiment, the camera module 1180 of FIG. 12 may refer to the always-on camera 1100 of FIG. 1.

Referring to FIG. 12, the camera module 1180 may include a lens assembly 1210, a flash 1220, an image sensor 1230, an image stabilizer (e.g., including various circuitry) 1240, a memory 1250 (e.g., a buffer memory), or an image signal processor (e.g., including image processing circuitry) 1260. The lens assembly 1210 may collect light emitted from an object whose image is to be captured. The lens assembly 1210 may include one or more lenses. According to an embodiment, the camera module 1180 may include a plurality of lens assemblies 1210. In this case, the camera module 1180 may form, for example, a dual camera, a 360-degree camera, or a spherical camera. Some of the plurality of lens assemblies 1210 may have the same lens attribute (e.g., view angle, focal length, auto-focusing, f number, or optical zoom) or at least one lens assembly may have one or more lens attributes different from those of other lens assemblies. The lens assembly 1210 may include, for example, a wide-angle lens or a telephoto lens.

The flash 1220 may emit light used to reinforce light emitted or reflected from the object. According to an embodiment, the flash 1220 may include one or more light-emitting diodes (e.g., a red-green-blue (RGB) LED, a white LED, an infrared LED, or an ultraviolet LED), or a xenon lamp. The image sensor 1230 may convert light emitted or reflected from the object and transmitted through the lens assembly 1210 into an electrical signal to obtain an image corresponding to the object. According to an embodiment, the image sensor 1230 may include one image sensor selected from among image sensors having different attributes such as an RGB sensor, a black and white (BW) sensor, an IR sensor, or a UV sensor, a plurality of image sensors having the same attribute, or a plurality of image sensors having different attributes. Each image sensor included in the image sensor 1230 may be implemented by using, for example, a charged coupled device (CCD) sensor or a complementary metal oxide semiconductor (CMOS) sensor.

The image stabilizer 1240 may include various circuitry and move the image sensor 1230 or at least one lens included in the lens assembly 1210 in a specific direction or may control an operational attribute (e.g., adjust a read-out timing) of the image sensor 1230, in response to a movement of the camera module 1180 or the electronic device 1101 including the camera module 1180. This compensates for at least part of a negative effect by the movement on a captured image. According to an embodiment, the image stabilizer 1240 may detect such a movement of the camera module 1180 or the electronic device 1101 by using a gyro sensor (not shown) or an acceleration sensor (not shown) located inside or outside the camera module 1180. According to an embodiment, the image stabilizer 1240 may be implemented as, for example, an optical image stabilizer. The memory 1250 may at least temporarily store at least a part of an image obtained through the image sensor 1230 for a next image processing operation. For example, when image acquisition is delayed due to shutter lag or a plurality of images are obtained at high speed, an obtained original image (e.g., a Bayer-patterned image or a high-resolution image) may be stored in the memory 1250 and a corresponding copy image (e.g., a low-resolution image) may be previewed through the display module 1160. Next, when a designated condition is satisfied (e.g., a user input or a system command), at least a part of the original image stored in the memory 1250 may be obtained and processed by, for example, the image signal processor 1260. According to an embodiment, the memory 1250 may be configured as at least a part of the memory 1130 or as a separate memory that operates independently from the memory 1130.

The image signal processor 1260 may include various image signal processing circuitry and perform one or more image processing operations on an image obtained through the image sensor 1230 or an image stored in the memory 1250. The one or more image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). In addition or alternatively, the image signal processor 1260 may perform control (e.g., exposure time control or read-out timing control) on at least one (e.g., the image sensor 1230) of the elements included in the camera module 1180. An image processed by the image signal processor 1260 may be stored again in the memory 1250 for additional processing or may be provided to an external element (e.g., the memory 1130, the display module 1160, the electronic device 1102, the electronic device 1104, or the server 1108) outside the camera module 1180. According to an embodiment, the image signal processor 1260 may be configured as at least a part of the processor 1120 or may be configured as a separate processor that operates independently from the processor 1120. When the image signal processor 1260 is configured as a separate processor from the processor 1120, at least one image processed by the image signal processor 1260 may be displayed directly by the processor 1120, or may be additionally processed and then may be displayed on the display module 1160.

According to an embodiment, the electronic device 1101 may include a plurality of camera modules 1180 having different attributes or functions. In this case, for example, at least one of the plurality of camera modules 1180 may be a wide-angle camera and at least another may be a telephoto camera. Likewise, at least one of the plurality of camera modules 1180 may be a front camera and at least another may be a rear camera.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an electronic device, the method comprising:
   obtaining image data, by using an always-on camera;
   obtaining sensor data;
   obtaining combined data from the image data and the sensor data, based on an obtained time of the image data and an obtained time of the sensor data;
   extracting a plurality of features, based on the combined data;
   generating and storing a plurality of feature sets sequentially according to a time when one or more features in the plurality of feature sets are generated, each feature set of the plurality of feature sets including one or more features of the plurality of features; and
   performing clustering on the plurality of feature sets to produce a plurality of clusters, at least one cluster of the plurality of clusters including one or more feature sets including a first feature type and one or more feature sets including a second feature type, and storing a result of performing the clustering.

2. The method of claim 1, further comprising identifying whether the electronic device is in an idle state based on the plurality of features, and determining whether to store the generated plurality of feature sets based on a result of the identifying.

3. The method of claim 1, wherein the clustering is performed when a number of feature sets on which clustering has not been performed, from among the plurality of feature sets stored in the electronic device, is equal to or greater than a pre-determined value.

4. The method of claim 1, wherein the performing of the clustering on the plurality of feature sets comprises:

performing first clustering on the plurality of feature sets, based on a first feature from among the plurality of features;

generating at least one of a person identifier (ID) and a cluster ID corresponding to a cluster generated as a result of performing the first clustering; and performing second clustering on the plurality of feature sets, based on a second feature from among the plurality of feature sets.

5. The method of claim 4, wherein the person ID is generated based on a face feature from among the plurality of features.

6. The method of claim 1, further comprising:

obtaining new image data;

extracting at least one feature, based on the new image data;

generating at least one new feature set, based on the at least one feature of the new image data; and comparing the at least one new feature set with the plurality of feature sets.

7. The method of claim 1, further comprising generating, as a representative feature set, a feature set having a high correlation with a plurality of feature sets of a cluster generated as the result of performing the clustering, wherein the representative feature set is a feature set selected from among the plurality of feature sets or a feature set in which features are combined to have a high correlation with the plurality of feature sets.

8. The method of claim 7, further comprising:

obtaining new image data;

extracting at least one feature, based on the new image data;

generating at least one new feature set, based on the at least one feature of the new image data; and comparing the at least one new feature set with at least one of the representative feature set and the plurality of feature sets.

9. The method of claim 1, further comprising determining a period in which the image data is obtained from the always-on camera.

10. The method of claim 9, wherein it is identified whether the electronic device is in an idle state based on the plurality of features, and the period in which the image data is obtained is determined based on a result of the identifying.

11. The method of claim 9, wherein the period in which the image data is obtained is determined, based on whether a new cluster is generated as the result of performing the clustering.

12. A non-transitory computer-readable recording medium having recorded thereon a program which, when executed on a computer, causes an electronic device to perform the operations of claim 1.

13. An electronic device comprising:

an always-on camera;

at least one sensor;

a memory in which at least one instruction is stored; and at least one processor, individually and/or collectively, configured to execute the at least one instruction to:

obtain image data, by using the always-on camera, obtain sensor data, by using the at least one sensor, obtain combined data from the image data and the sensor data, based on an obtained time of the image data and an obtained time of the sensor data, extract a plurality of features, based on the combined data, generate and store a plurality of feature sets sequentially according to a time when one or more features in the plurality of feature sets are generated, each feature set of the plurality of feature sets including one or more features of the plurality of features, perform clustering plurality of feature sets to produce a plurality of clusters, at least one cluster of the plurality of clusters including one or more feature sets including a first feature type and one or more feature sets including a second feature type, and store a result of performing the clustering.

14. The electronic device of claim 13, wherein the at least one processor, individually and/or collectively, is further configured to identify whether the electronic device is in an idle state based on the plurality of features, and determine whether to store the generated plurality of feature sets based on a result of the identifying.

15. The electronic device of claim 13, wherein the at least one processor, individually and/or collectively, is further configured to determine a period in which a data processing module in the electronic device requests the always-on camera for the image data.

16. The electronic device of claim 13, wherein the at least one processor, individually and/or collectively, is further configured to:

perform first clustering on the plurality of feature sets based on a first feature from among the plurality of features;

generate at least one of a person identifier (ID) and a cluster ID corresponding to a cluster generated as a result of performing the first clustering; and perform second clustering on the plurality of feature sets based on a second feature from among the plurality of features.

17. The electronic device of claim 13, wherein the at least one processor, individually and/or collectively, is further configured to:

obtain new image data;

extract at least one feature based on the new image data;

generate at least one new feature set based on the at least one feature of the new image data; and compare the at least one new feature set with the plurality of feature sets.

18. The electronic device of claim 13, wherein the at least one processor, individually and/or collectively, is further configured to:

generate, as a representative feature set, a feature set having a correlation with a plurality of feature sets greater than a specified threshold of a cluster generated as the result of performing the clustering, wherein the representative feature set is a feature set selected from among the plurality of feature sets or a feature set in which features are combined to have a correlation with the plurality of feature sets greater than a specified threshold.

19. The electronic device of claim 18, wherein the at least one processor, individually and/or collectively, is further configured to:

obtain new image data;

extract at least one feature based on the new image data;

generate at least one new feature set based on the at least one feature of the new image data; and compare the at least one new feature set with at least one of the representative feature set and the plurality of feature sets.

20. The electronic device of claim 13, wherein the at least one processor, individually and/or collectively, is further configured to determine a period in which the image data is obtained from the always-on camera.

\*     \*     \*     \*     \*